United States Patent
Vasan et al.

(10) Patent No.: US 9,984,128 B2
(45) Date of Patent: May 29, 2018

(54) MANAGING SITE-BASED SEARCH CONFIGURATION DATA

(71) Applicant: Splunk Inc., San Francisco, CA (US)

(72) Inventors: Sundar Rengarajan Vasan, San Francisco, CA (US); Mitchell Neuman Blank, Jr., San Francisco, CA (US); Vishal Patel, San Francisco, CA (US); Da Xu, San Francisco, CA (US); Rama Gopalan, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 241 days.

(21) Appl. No.: 14/815,880

(22) Filed: Jul. 31, 2015

(65) Prior Publication Data
US 2015/0339308 A1    Nov. 26, 2015

Related U.S. Application Data

(63) Continuation of application No. 14/266,812, filed on Apr. 30, 2014, now Pat. No. 9,130,971, which is a (Continued)

(51) Int. Cl.
*G06F 17/30* (2006.01)
*H04L 29/08* (2006.01)
(Continued)

(52) U.S. Cl.
CPC ........ *G06F 17/30528* (2013.01); *G06F 11/20* (2013.01); *G06F 11/2094* (2013.01);
(Continued)

(58) Field of Classification Search
CPC .. G06F 3/065; G06F 17/30575; G06F 3/0617; G06F 17/30528; G06F 17/30867;
(Continued)

(56) References Cited

U.S. PATENT DOCUMENTS

| | | |
|---|---|---|
| 5,717,911 A | 2/1998 | Madrid et al. |
| 5,975,738 A | 11/1999 | DeKoning et al. |

(Continued)

FOREIGN PATENT DOCUMENTS

| | | |
|---|---|---|
| EP | 1804167 | 7/2007 |

OTHER PUBLICATIONS

U.S. Appl. No. 13/648,116, Notice of Allowance dated Apr. 7, 2014.
(Continued)

*Primary Examiner* — Albert M Phillips, III

(57) ABSTRACT

Techniques are described for managing data within a multi-site clustered data intake and query system. A data intake and query system as described herein generally refers to a system for collecting, retrieving, and analyzing data. In this context, a clustered data intake and query system generally refers to a system environment that is configured to provide data redundancy and other features that improve the availability of data stored by the system. For example, a clustered data intake and query system may be configured to store multiple copies of data stored by the system across multiple components such that recovery from a failure of one or more of the components is possible by using copies of the data stored elsewhere in the cluster.

30 Claims, 11 Drawing Sheets

Related U.S. Application Data continuation-in-part of application No. 13/648,116, filed on Oct. 9, 2012, now Pat. No. 8,788,459.

(60) Provisional application No. 61/647,245, filed on May 15, 2012.

(51) Int. Cl.
*G06F 11/20* (2006.01)
*G06F 3/06* (2006.01)

(52) U.S. Cl.
CPC .... *G06F 17/3087* (2013.01); *G06F 17/30241* (2013.01); *G06F 17/30336* (2013.01); *G06F 17/30575* (2013.01); *G06F 17/30581* (2013.01); *G06F 17/30867* (2013.01); *H04L 67/1097* (2013.01); *G06F 3/065* (2013.01); *G06F 3/067* (2013.01); *G06F 3/0617* (2013.01)

(58) Field of Classification Search
CPC ......... G06F 17/30336; G06F 17/30581; G06F 17/3087; G06F 17/30241; G06F 11/2094; G06F 3/067; G06F 11/20; H04L 67/1097
See application file for complete search history.

(56) References Cited

U.S. PATENT DOCUMENTS

| | | | |
|---|---|---|---|
| 6,334,124 B1* | 12/2001 | Bouchard | G06Q 10/06 |
| 6,823,336 B1 | 11/2004 | Srinivasan et al. | |
| 6,839,819 B2 | 1/2005 | Martin | |
| 7,085,904 B2 | 8/2006 | Mizuno et al. | |
| 7,162,601 B2 | 1/2007 | Yamagami | |
| 7,167,880 B2 | 1/2007 | Amano et al. | |
| 7,243,197 B2 | 7/2007 | Yamagami | |
| 7,693,885 B2 | 4/2010 | Okada et al. | |
| 7,792,897 B2 | 9/2010 | Foss et al. | |
| 8,112,425 B2 | 2/2012 | Baum et al. | |
| 8,195,153 B1 | 6/2012 | Frencel et al. | |
| 8,560,886 B1 | 10/2013 | Kekre et al. | |
| 8,732,162 B2 | 5/2014 | Harris | |
| 8,788,459 B2 | 7/2014 | Patel et al. | |
| 9,124,612 B2 | 9/2015 | Vasan et al. | |
| 9,130,971 B2 | 9/2015 | Vasan et al. | |
| 9,160,798 B2 | 10/2015 | Patel et al. | |
| 2002/0062336 A1 | 5/2002 | Teodosiu et al. | |
| 2004/0199553 A1 | 10/2004 | Byrne et al. | |
| 2004/0268067 A1 | 12/2004 | Yamagami | |
| 2005/0015416 A1 | 1/2005 | Yamagami | |
| 2005/0235016 A1 | 10/2005 | Amano et al. | |
| 2005/0268145 A1 | 12/2005 | Hufferd et al. | |
| 2006/0149798 A1 | 7/2006 | Yamagami | |
| 2006/0179129 A1 | 8/2006 | Clayton et al. | |
| 2007/0083567 A1 | 4/2007 | Arai et al. | |
| 2007/0094312 A1 | 4/2007 | Sim-Tang | |
| 2007/0100917 A1 | 5/2007 | Amano et al. | |
| 2007/0112893 A1 | 5/2007 | Okada et al. | |
| 2007/0112894 A1 | 5/2007 | Okada et al. | |
| 2007/0115738 A1 | 5/2007 | Emaru et al. | |
| 2007/0174246 A1 | 7/2007 | Sigurdsson et al. | |
| 2007/0185923 A1 | 8/2007 | Nishikawa et al. | |
| 2007/0198604 A1 | 8/2007 | Okada et al. | |
| 2007/0220309 A1 | 9/2007 | Andre et al. | |
| 2009/0271412 A1 | 10/2009 | Lacapra et al. | |
| 2010/0005151 A1 | 1/2010 | Gokhale | |
| 2010/0191922 A1 | 7/2010 | Dickey et al. | |
| 2011/0161335 A1 | 6/2011 | Dash et al. | |
| 2012/0144033 A1 | 6/2012 | Daude et al. | |
| 2012/0278344 A1* | 11/2012 | Berg | G06F 17/3048 707/754 |
| 2012/0297236 A1 | 11/2012 | Ziskind et al. | |
| 2012/0310912 A1 | 12/2012 | Shah et al. | |
| 2013/0311428 A1 | 11/2013 | Patel et al. | |
| 2014/0236889 A1 | 8/2014 | Vasan | |
| 2014/0236890 A1 | 8/2014 | Vasan | |
| 2015/0347523 A1 | 12/2015 | Patel et al. | |
| 2016/0055225 A1 | 2/2016 | Xu et al. | |

OTHER PUBLICATIONS

U.S. Appl. No. 13/662,358, Non-Final Office Action dated Jul. 30, 2014.
U.S. Appl. No. 14/266,817, Non-Final Office Action dated Aug. 15, 2014.
U.S. Appl. No. 14/266,812, Non-Final Office Action dated Aug. 20, 2014.
U.S. Appl. No. 14/266,817, Final Office Action dated Dec. 23, 2014.
U.S. Appl. No. 14/266,812, Final Office Action dated Jan. 22, 2015.
U.S. Appl. No. 13/662,358, Final Office Action dated Feb. 17, 2015.
U.S. Appl. No. 14/266,817, Advisory Action dated Mar. 4, 2015.
U.S. Appl. No. 14/266,812, Advisory Action dated Mar. 5, 2015.
U.S. Appl. No. 14/266,817, Notice of Allowance dated Apr. 24, 2015.
U.S. Appl. No. 14/266,812, Notice of Allowance dated Apr. 30, 2015.
U.S. Appl. No. 13/662,358, Notice of Allowance dated May 27, 2015.
Common Information Model (CIM), dated Sep. 21, 2005, 1 page.
Community: Forwarder Best Practice.
Community: Multiple Index Server Deployment Options.
Community: Understanding Buckets.
Fairhurst, IPv4 Packet Header, dated 2008, pp. 1-2.
Jackson, NPR Deploys Splunk for Web Analytics, dated Mar. 24, 2011, pp. 1-3.
Metanode Organized Prototype Hierarchy Specification (Morph), Version 0.9b, dated Mar. 7, 2006, pp. 1-48.
Sinofsky, Designing the Windows 8 file name collision experience, dated Aug. 26, 2011, 2 pages.
"High-Availability Cluster", Wikipedia, Free Encyclopedia, Last Modified Oct. 24, 2012, http://en.wikipedia.org/wiki/High.sub.--availability.sub.--cluster, pp. 1-4.
"RAID," Wikipedia, the free encyclopedia, Last Modified Nov. 2, 2012, http://en.wikipedia.org/wiki/RAID, pp. 1-23.
Adams, Michael, "How Snapshot Technology Will Change the Future of Backup and Recovery"—Technology Information, Computer Technology Review, Jan. 2001, 4 pages.
Carasso, D., "Exploring Splunk: Search Processing Language (SPL) Primer and Cookbook," Splunk, Apr. 2012, 156 pages.
Final Office Action dated Aug. 1, 2013 for U.S. Appl. No. 13/662,358, 27 pages.
Kaczmarski, M., "Beyond Backup Toward Storage Management," IBM Systems Journal, vol. 42, No. 2, Apr. 2003, 16 pages.
Marshall Brain, How Domain Servers Work, Feb. 1, 2009, pp., 4 pages.
Official Communication for U.S. Appl. No. 13/662,358 dated Jan. 28, 2013, 21 pages.
The Authoritative Dictionary of IEEE Standards Terms, 7th Ed., 2000, p. 123.
Final Office Action dated Aug. 1, 2013 for U.S. Appl. No. 13/648,116, 24 pages.
Non-Final Office Action dated Nov. 1, 2013 for U.S. Appl. No. 13/648,116, 46 pages.
Official Communication for U.S. Appl. No. 13/648,116 dated Jan. 28, 2013, 22 pages.

\* cited by examiner

MANAGING SITE-BASED SEARCH CONFIGURATION DATA

CROSS-REFERENCE TO RELATED APPLICATIONS

This application claims benefit under 35 U.S.C. § 120 as a Continuation of U.S. application Ser. No. 14/266,812, filed on Apr. 30, 2014, which claims benefit as a Continuation-in-part of U.S. application Ser. No. 13/648,116, filed on Oct. 9, 2012, which claims the benefit of U.S. Provisional Application 61/647,245, filed May 15, 2012. This application is also related to U.S. application Ser. No. 13/662,358, filed on Oct. 26, 2012. The entire contents of each of the above-listed applications is hereby incorporated by reference for all purposes as if fully set forth herein.

FIELD OF THE DISCLOSURE

The present disclosure generally relates to managing data within a clustered environment and, more particularly, to managing data within a clustered environment that includes computing resources located at a plurality of sites.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The performance and capabilities of computing devices have increased dramatically since their introduction. However, computing devices of all types remain susceptible to device failures, whether from malfunctioning device hardware or from external conditions such as a loss of electrical power. For businesses and users that rely on computing devices, such failures can result in highly undesirable downtime and possible data loss.

For some computing environments, a cluster architecture may be configured to mitigate some of the problems caused by device failures. In general, a cluster consists of multiple computing devices that may be connected by a network and that operate in a coordinated fashion to provide access to data and/or one or more computing services. In order to provide for high data availability and the ability to recover from disasters, a cluster architecture may be configured to replicate data stored by the cluster across multiple components of the cluster. In this manner, if one or more of the cluster components fails, data stored by the failed components may be made available through one or more of the other components storing a replicated copy of the data.

Some cluster architectures that are employed for data backup may spread different portions of data across a large number of components within the cluster to minimize the likelihood of losing large amounts of data should one or more of the components fail. However, when loss of even a portion of the data may be significant, this may not be a tolerable result.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
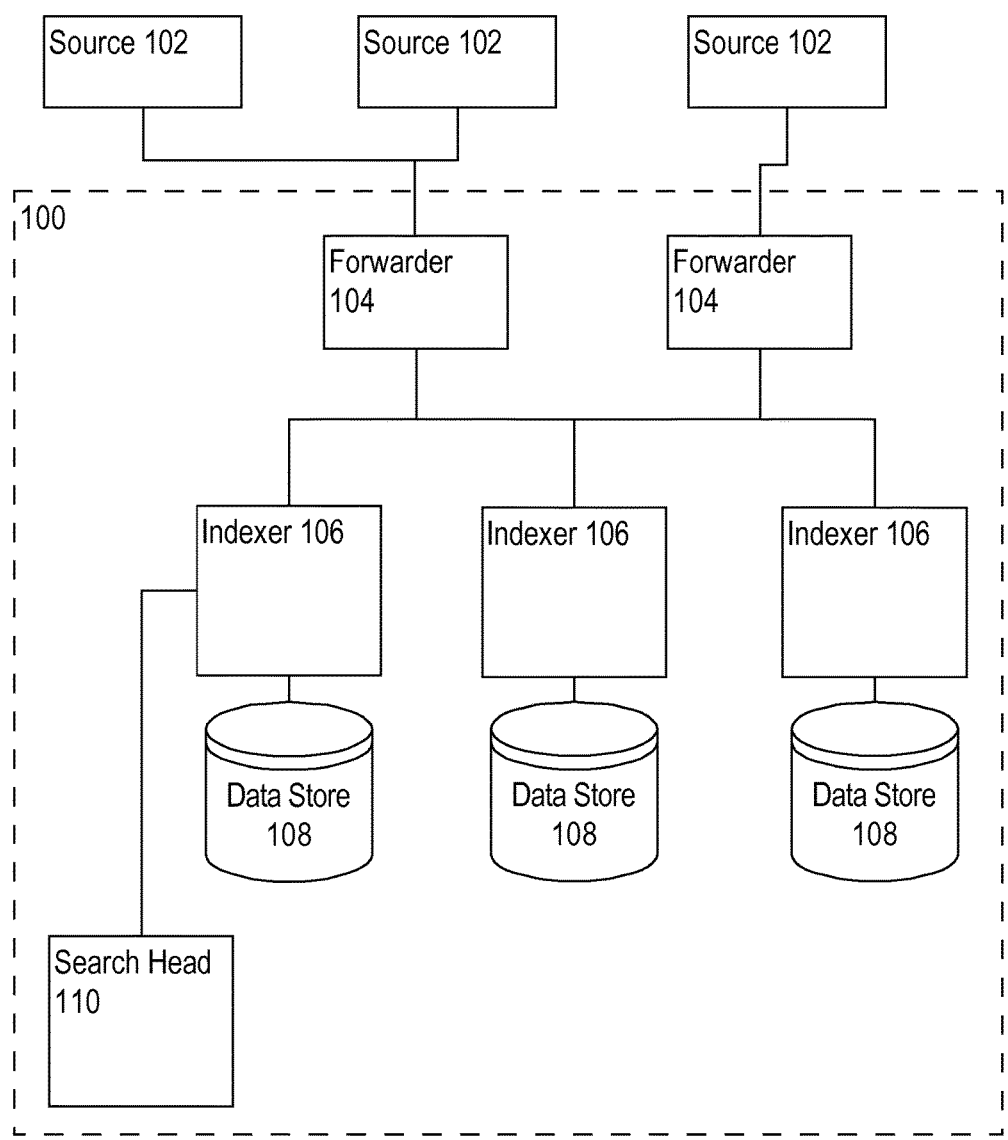
FIG. 1 illustrates an example block diagram of a data intake and query system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Operating Environment
3.0 Clustered Operating Environment
4.0. Multi-Site Clusters
5.0 Site-Based Search Affinity
6.0. Implementation Mechanisms—Hardware Overview
7.0. Example Embodiments
8.0. Extensions and Alternatives

1.0. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

According to various embodiments, techniques are described for managing data within a multi-site clustered data intake and query system. A data intake and query system as described herein generally refers to a system for collecting, retrieving, and analyzing data such as machine-generated data. A clustered data intake and query system generally refers to a system environment that provides data redundancy and other features to improve the availability of data stored by the system. For example, a clustered data intake and query system may be configured to store multiple copies of data stored by the system across multiple components such that recovery from a failure of one or more of the components is possible by using copies of the data stored elsewhere in the cluster.

However, if all components of a cluster are co-located at the same geographic location, or if the cluster includes geographically dispersed components but data is not replicated across different geographic locations, a cluster may nevertheless be susceptible to site-wide failures. In one embodiment, to further improve the resiliency of a cluster against site-wide failures, a cluster may be configured such that various components of the cluster are located at multiple different sites and data is replicated across components at different sites. A "site" in this context may refer to a logical and user-configurable grouping of one or more cluster components that may each be associated with a particular geographic location. For example, a particular defined site may represent a collection of cluster components that are housed at an individual data center, office building, or other facility at a distinct geographic location. By configuring a cluster with two or more geographically dispersed sites, data replication policies may be defined that ensure that all data in the system is replicated across cluster components located at multiple sites, thereby providing the cluster with additional resiliency against site-wide failures within the cluster.

In one embodiment, the components of a multi-site clustered data intake and query system may include one or more "indexers." Each indexer generally represents a computing resource that is configured to process, index, and store data and to retrieve subsets of the data in response to search requests. Because the data of a cluster may be stored across a number of indexers, search requests against data stored in a cluster may be distributed to several indexers within the cluster for processing. In one embodiment, a cluster component referred to as a "search head" may be responsible for distributing searches across multiple indexers of a cluster and collating the results.

A multi-site cluster may include one or many search heads, and each search head generally may be located at any site of the cluster. Because the data of a cluster may be stored on indexers that span multiple sites, a search head may distribute a search query to indexers associated with the same site as the search head as well as indexers located at other sites. Depending on a number of different sites configured in a multi-site cluster, and the quality of the network connections between the different sites, a search head may experience undesirable network latency when retrieving a large number of results from indexers located at sites that are different from the search head. In one embodiment, to reduce network latency associated with retrieving results from indexers located at sites that are different from the site from which a search originates, "search affinity" information may be used by indexers of a multi-site cluster to increase the likelihood that search results for a search query originating from a search head of a particular site are satisfied by indexers located at the same site. In an embodiment, search affinity information indicates, for each subset of data stored by an indexer and that may be replicated across other indexers at multiple sites, whether the indexer is responsible for returning results from the subset of data for searches originating from particular sites. By controlling when each indexer returns results from each subset of data stored by the indexer depending on where a search request originates, preference may be given to indexers that are located at the same site at which a search originates, thereby decreasing the likelihood that a search head is retrieving results from other geographically dispersed sites.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Operating Environment

There is tremendous growth in the amount of data generated in the world. With decreasing storage costs and seemingly infinite capacity due to cloud services, there are fewer reasons to discard old data, and many reasons to retain it. As a result, challenges have shifted towards extracting useful information from massive quantities of data.

Mining a massive dataset is non-trivial but an even more challenging task is to mine multiple datasets from various sources and to cross-correlate the data. For example, a typical datacenter may monitor data from thousands of components; log and data output formats and collection granularities vary by component type and generation. However, an underlying assumption that can be made is that each component has a notion of time, either via timestamps or event sequences, that is captured in the logs or other data output. As the quantity and diversity of data grows, there is an increasing need for efficiently performing full text searches to mine the data.

Another challenge is that a large fraction of the world's data is unstructured, making it difficult to index and query using traditional databases. Even if a dataset is structured, the specifics of the structure may evolve with time, for example, as a consequence of system upgrades or more/less restrictive data collection/retention policies.

SPLUNK® ENTERPRISE is software produced and sold for on-premise and cloud use by Splunk Inc. of San Francisco, Calif. SPLUNK® ENTERPRISE is a comprehensive system that generates, stores, retrieves, and searches event data. SPLUNK® ENTERPRISE has gained particular appeal in the market for deriving events from unstructured data and machine data. It is the leading software for providing real-time operational intelligence, enabling organizations to collect, index, and harness machine-generated data coming from the applications, servers, networks, mobile devices, etc., that power their businesses.

At a high level, SPLUNK® ENTERPRISE can take raw data, unstructured data, or machine data such as data in Web logs, syslogs, sensor readings, etc., divide the data up into portions, and optionally transform at least part of the data in these portions to produce time-stamped events. The software derives a time stamp for each event by extracting it from the event data itself or by interpolating an event's time stamp relative to other events for which the software can derive a time stamp. SPLUNK® ENTERPRISE then stores the events in a time-series data store against which it can run queries to retrieve events that meet specified criteria, such as having certain keywords and/or having certain value(s) for certain defined field(s).

SPLUNK® ENTERPRISE is particularly noteworthy for employing a so-called "late-binding schema." As noted, an event in SPLUNK® ENTERPRISE typically contains a portion of raw data (or a transformed version of such). To run queries against events other than those involving keyword searches, a schema can be developed. Such a schema can include extraction rules for one or more fields. Each field can be defined for a subset of the events in the data store and an extraction rule can specify how to extract a value from each of the subset of events for which the field has been defined. The extraction rule for a field is often defined using a regular expression ("regex" rule), and it associates event data with a logical type of information that is contained within an event for which it is defined. The term "late-binding schema" refers to a system, such as in SPLUNK® ENTERPRISE, which does not define the schema at index time as with database technology; rather, in a system involving late-binding schema, the schema can be developed on an ongoing basis up until the time it needs to be applied (which is query time, as a query often specifies the criteria for events of interest in terms of events having specified value(s) for specified field(s)). As a data analyst learns more about the data in stored events, using a late-binding schema, he can continue to develop the schema up until the next time it is needed for a query.

Because SPLUNK® ENTERPRISE maintains the underlying searchable raw data and enables application of a late-binding schema, it has great power to enable dynamic investigation of issues that arise as a data analyst learns more about the data stored in the system's events.

As discussed herein, "time-series data" and "time-series machine data" may include, among other things, a series or sequence of data points generated by one or more data sources, computing devices, or sensors. Each data point may be a value, a small segment of data, or a large segment of data, and each data point may be associated with a timestamp or be associated with a particular point in time that provides the basis for a timestamp for the data point. The series of data points, or values/statistics derived from the data points, may be plotted over a time range or time axis representing at least a portion of the time range. The data can be structured, unstructured, or semi-structured and can come from files, directories, network packets, network events, and/or sensors. Unstructured data may refer, for example, to data whose structure is not fully understood or appreciated at the time the data is obtained by a data storage system, or it may refer to data that was generated without a particular schema in mind to facilitate the extraction of values for fields in the data during a search on the data. Machine data generated by, for example, data sources within an enterprise network environment is generally considered to be unstructured data. The visualization of such time-series data may be used to display statistical trends over time. The time-series machine data collected from a data source may be segmented or otherwise transformed into discrete events, where each event can be associated with a timestamp.

An "event" may include a single record of activity from a particular data source associated with a single timestamp. Such an event may correspond to, for example, one or more lines in a log file or other data input. Further, "events" may be derived from processing or indexing machine data, as described herein, or may include other kinds of events or notable events described herein. Events can also correspond to any time-series data, such as performance measurements of an IT component (e.g., a computer cluster, node, host, virtual machine, etc.), a sensor measurement, etc.

In an example, a field extractor within an enterprise network environment may be configured to automatically identify (e.g., using regular expression-based rules, delimiter-based rules, etc.) certain fields in the events while the events are being created, indexed, and/or stored. Alternatively, one or more fields can be identified within the events and added to the field extraction rules (used by the field extractor to identify fields within the events) by a user using a variety of techniques. Additionally, fields that correspond to metadata about the events, such as a timestamp, host, source, and source type for an event, may also be created; such fields may, in some cases, be referred to as "default fields" if they are determined automatically for all events at the time such events are created, indexed, and/or stored.

In some implementations, a given tag or alias may be assigned to a set of two or more fields to identify multiple fields that correspond to equivalent pieces of information, even though those fields may have different names or be defined for different sets of events. A set of tags or aliases used to identify equivalent fields in this way may be referred to as a common information model.

Data generated by various data sources may be collected and segmented into discrete events, each event corresponding to data from a particular point in time. Examples of such data sources include, but are not limited to, web servers, application servers, databases, firewalls, routers, operating systems, software applications executable at one or more computing devices within the enterprise data system, mobile devices, sensors, etc. The types of data generated by such data sources may be in various forms including, for example and without limitation, server log files, activity log files, configuration files, messages, network packet data, performance measurements or metrics, sensor measurements, etc.

FIG. 1 shows a block diagram of SPLUNK® ENTERPRISE's data intake and query system, which provides an example embodiment of a data intake and query system 100. Generally, the system 100 includes one or more forwarders 104 that collect data from a variety of different data sources 102. The forwarders 104 determine which indexer or indexers are to receive the data and forward the data to one or more indexers 106. The data typically includes streams of time-series data. Time-series data refers to any data that can be segmented such that each segment can be associated with a time stamp. The data can be structured, unstructured, or semi-structured and can come from files and directories. Unstructured data is data that is not organized to facilitate the extraction of values for fields from the data, as is often the case with machine data and web logs, two popular data sources for SPLUNK® ENTERPRISE. Alternatively, heavy forwarders can strip out extraneous data and detect time stamps for the data. Based on the time stamps, the heavy forwarders can index and group the data into buckets that fall within a common time span. The heavy forwarders then determine which indexer or indexers are to receive each bucket of data and forward the data to one or more indexers 106.

Figure 2:
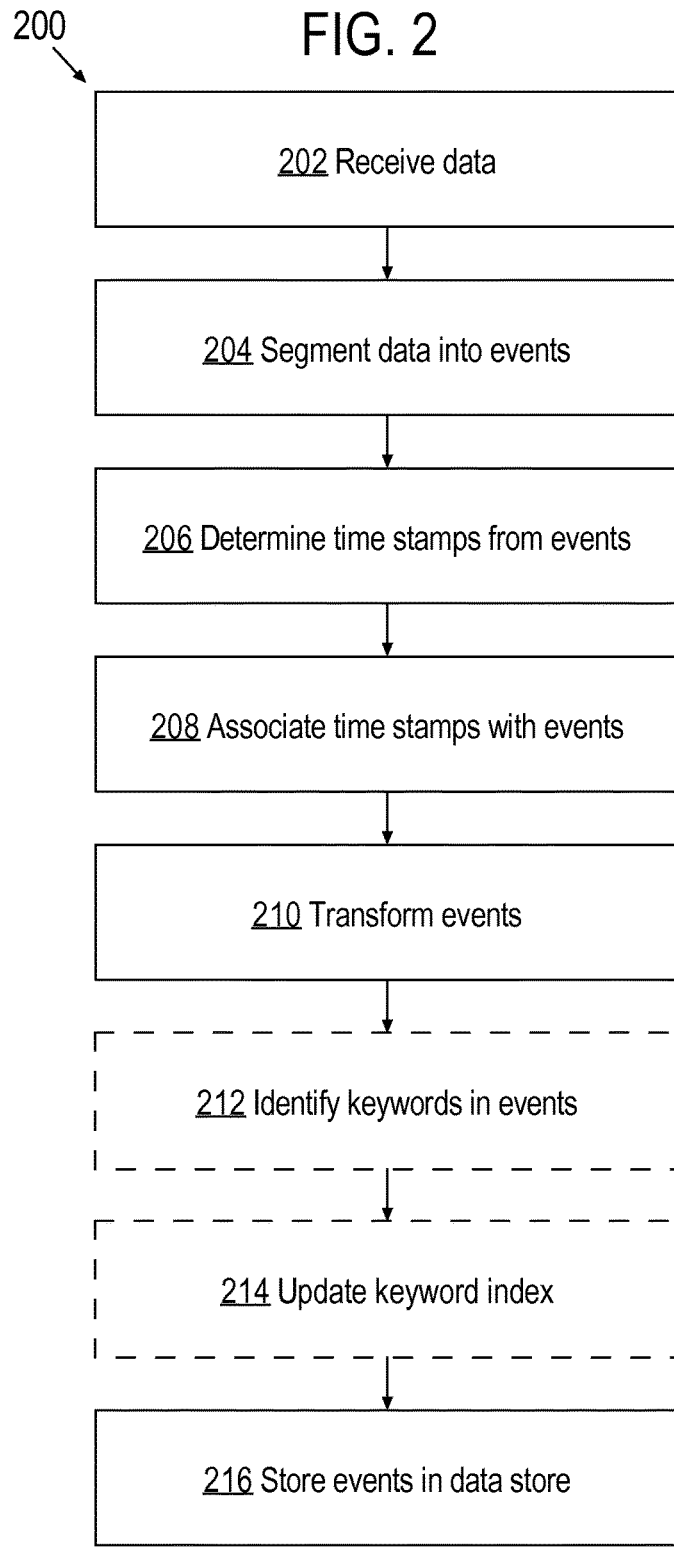
FIG. 2 illustrates a flowchart of a process that indexers may use to process, index, and store data received from forwarders, according to an embodiment of the invention.

FIG. 2 is a flowchart 200 of a process that indexers 106 may use to process, index, and store data received from the forwarders 104. At block 202, an indexer 106 receives data from a forwarder 104. At block 204, the indexer segments the data into events. The data typically consists of many lines of text that are separated by a carriage return or line break. An event may consist of one or more of these lines. The task of the indexer 106 is to determine where an event begins and ends in the lines of data. The indexer 106 can use heuristics that allow it to automatically determine how many lines constitute an event. The indexer 106 may be informed of the source of the data and have a set of heuristic rules for the source. The indexer 106 may also be able to examine a sampling of the data and automatically determine the source of the data and have a set of heuristic rules for that source. These heuristics allow the indexer 106 to use regular expression-based rules, delimiter-based rules, etc., to examine the text in each line in order to combine lines of data to form an event. The indexer 106 can examine the text for event boundaries within the text that include, but are not limited to: predefined characters, character strings, etc. These may include certain punctuation marks or special characters including, for example, carriage returns, tabs, spaces, line breaks, etc. In some instances, a user can fine tune or configure the rules that the indexers 106 use to examine the text in order to adapt to the user's equipment.

The indexer 106 determines a time stamp for each event at block 206. The time stamp can be determined by extracting the time from data in the event or by interpolating the time based on time stamps from other events. In some cases, a time stamp can be determined from the time the data was received or generated. The indexer 106 associates the time stamp with each event at block 208. For example, the time stamp may be stored as metadata for the event.

At block 210, the data included in a given event can be transformed. Such a transformation can include such actions as removing part of an event (e.g., a portion used to define event boundaries, extraneous text, characters, etc.) or removing redundant portions of an event. A user can specify a portion to remove using a regular expression or any similar method.

Optionally, a key word index can be built to facilitate fast keyword searching of events. To build such an index, in block 212, the indexer 106 identifies a set of keywords contained in the events. At block 214, the indexer 106 includes each identified keyword in an index, which associates with each stored keyword pointers to each event containing that keyword (or locations within events where that keyword is found). When an indexer 106 receives a keyword-based query, the indexer 106 can then consult this index to quickly find those events containing the keyword without having to examine again each individual event, thereby greatly accelerating keyword searches.

Optionally, an indexer 106 may facilitate fast searching of event data by creating a high performance analytics store. An indexer 106 may create a high performance analytics store by identifying, for each field of one or more selected fields contained in the events, a set of unique values contained in the field. Based on the identified unique values, a summarization table may be created with one or more entries each identifying a field name and a field value that have been extracted from event records. By examining the entries in the summarization table, an indexer 106 may rapidly find events having a particular value for a particular field and/or rapidly determine how many events are associated with a particular value for a particular field.

Techniques for increasing search performance using high performance analytics stores are described in U.S. Pat. No. 8,682,925, issued on Mar. 25, 2014, which is hereby incorporated by reference in its entirety for all purposes.

The indexer 106 stores events in a data store 108 at block 216. The data in a data store 108 can be stored in working, short-term and/or long-term memory in a manner retrievable by query. The time stamp can be stored along with each event to help optimize searching the events by time range.

In some instances, the data stored in a data store 108 includes one or more individual storage "buckets." Each bucket may correspond to a time range. An event can then be stored in a bucket associated with a time range inclusive of the event's time stamp. This not only optimizes time based searches, but it can allow events with recent time stamps that may have a higher likelihood of being accessed to be stored at preferable memory locations that lend to quicker subsequent retrieval (such as flash memory instead of hard disk media).

Data stores 108 may be distributed across multiple indexers 106, each responsible for storing and searching a subset of the events generated by the system. The subset of events for which a particular indexer is responsible for may correspond to a set of time-based buckets that are stored by the particular indexer. By distributing the time-based buckets among the indexers 106, the indexers can find events responsive to a query in parallel using map-reduce techniques, each returning their partial responses for specific buckets to the query to a search head 110 that combines the results together to answer the query.

Figure 3:
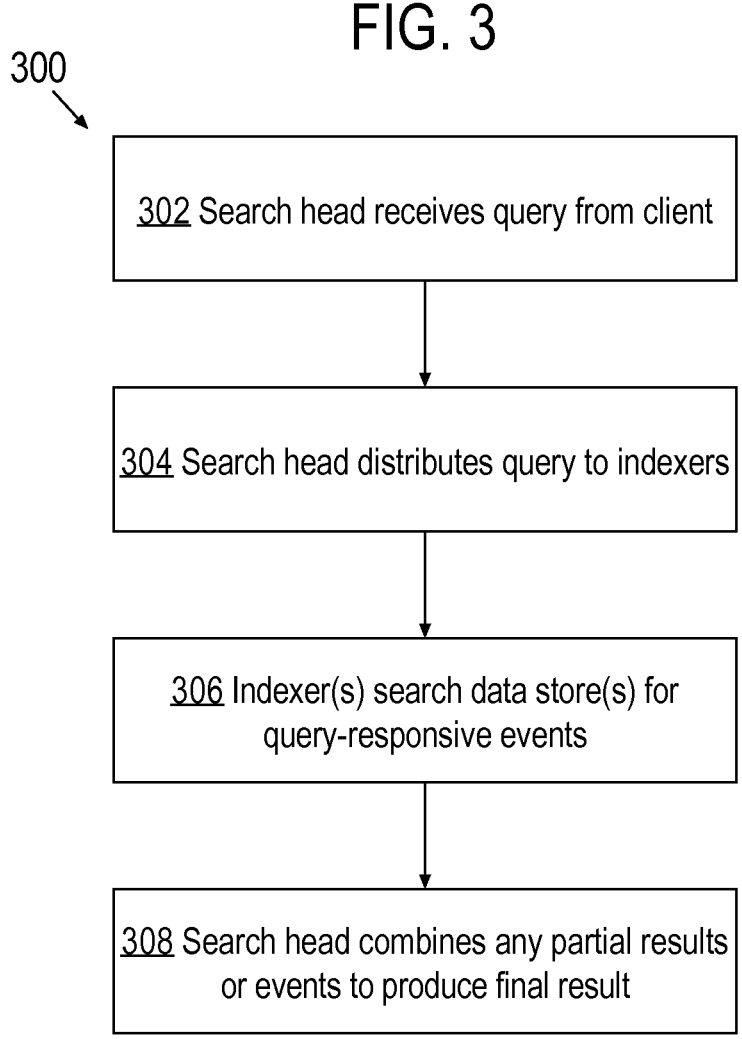
FIG. 3 illustrates a flowchart of a process that a search head and indexers perform during a typical search query, according to an embodiment of the invention.

FIG. 3 is a flowchart 300 of a process that a search head 110 and indexers 106 may perform during a typical search query. At block 302, a search head 110 receives a query from a client.

At block 304, the search head 110 is responsible for analyzing the search query to determine what part can be delegated for execution by indexers 106 and what part needs to be executed by the search head 110. Streaming commands can be trivially delegated to the indexers 106. Conversely, aggregating commands are more complex to distribute.

The search head 110 can perform optimization steps in order to make the search more efficient. As mentioned above, the indexers 106 may create an index of keywords. In one optimization, before the search starts executing, the search head 110 determines the time range required for the search and a set of common keywords that all matching events must have. The retrieval phase uses these parameters to query the indexers 106 for a superset of the eventual results. The indexers 106 return the superset of results that the search head can perform a filtering stage on. The filtering stage performs field extraction on the superset to arrive at a reduced set of search results.

Figure 4:
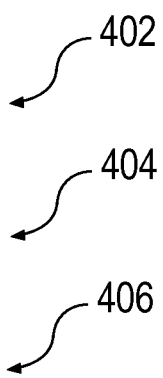
FIG. 4 illustrates an example of a search query received from a client that the search head can split into two parts, according to an embodiment of the invention.

In another optimization, to achieve better computation distribution and minimize the amount of data transferred between indexers 106 and the search head 110, many aggregating commands implement a map operation which the search head can delegate to the indexers 106 while executing the reduce operation locally. FIG. 4 shows an example of a search query 402 received from a client that the search head can split into two parts: one part to be executed by indexers 106 and one part to be executed by the search head 110. Here, the search query 402 makes the indexers responsible for counting the results by host and then sending their results to the search head 110. The search head 110 then performs the merging 406. This achieves both computation distribution and minimal data transfer.

The search head 110 may distribute the search query to one or more distributed indexers 106. The search query may contain one or more regular expressions that each of the indexers 106 is to apply to any event data that is determined to fall within the parameters of the regular expression. These indexers can include those with access to data stores having events responsive to the query. For example, the indexers can include those with access to events with time stamps within part or all of a time period identified in the query.

At block 306, one or more indexers 106 to which the query was distributed searches its data store 108 for events responsive to the query. To determine events responsive to the query, a searching indexer 106 finds events specified by the criteria in the query. This criteria can include that the events have particular keywords or contain a specified value or values for a specified field or fields (because this employs a late-binding schema, extraction of values from events to determine those that meet the specified criteria occurs at the time this query is processed). The indexer 106 may conduct a search for responsive events by processing the content of the events using the one or more regular expressions to extract information associated with fields specified in the one or more regular expressions, by using a key word index to search for keywords specified in the query, and/or by using a high performance value store or other search techniques.

The indexers 106 can either stream the relevant events back to the search head 110 or use the events to calculate a partial result responsive to the query and send the partial result back to the search head 110. At block 308, the search head 110 combines or reduces all of the partial results or events received from the parallel processing indexers together to determine a final result responsive to the query.

Data intake and query system 100 and the processes described with respect to FIGS. 1-4 are further discussed and elaborated upon in Carasso, David. Exploring Splunk Search Processing Language (SPL) Primer and Cookbook. New York: CITO Research, 2012 and in Ledion Bitincka, Archana Ganapathi, Stephen Sorkin, and Steve Zhang. Optimizing data analysis with a semi-structured time series database. In SLAML, 8070. Each of these references is hereby incorporated by reference in its entirety for all purposes.

SPLUNK® ENTERPRISE can accelerate some queries used to periodically generate reports that, upon each subsequent execution, are intended to include updated data. To accelerate such reports, a summarization engine periodically generates a summary of data responsive to the query defining the report for a defined, non-overlapping subset of the time period covered by the report. For example, where the query is meant to identify events meeting specified criteria, a summary for a given time period may include only those events meeting the criteria. Likewise, if the query is for a statistic calculated from events, such as the number of events meeting certain criteria, then a summary for a given time period may be the number of events in that period meeting the criteria.

Because the report, whenever it is run, includes older time periods, a summary for an older time period can save the work of having to re-run the query on a time period for which a summary was generated, so only the newer data needs to be accounted for. Summaries of historical time periods may also be accumulated to save the work of re-running the query on each historical time period whenever the report is updated.

A process for generating such a summary or report can begin by periodically repeating a query used to define a report. The repeated query performance may focus on recent events. The summarization engine determines automatically from the query whether generation of updated reports can be accelerated by creating intermediate summaries for past time periods. If it can, then a summarization engine can periodically create a non-overlapping intermediate summary covering new data obtained during a recent, non-overlapping time period and stores the summary in a summary data store.

In parallel to the creation of the summaries, the query engine schedules the periodic updating of the report defined by the query. At each scheduled report update, the query engine determines whether intermediate summaries have been generated covering parts of the time period covered by the current report update. If such summaries exist, then the report is based on the information from the summaries; optionally, if additional data has been received that has not yet been summarized but that is required to generate a complete report, then the query is run on this data and, together with the data from the intermediate summaries, the updated current report is generated. This process repeats each time an updated report is scheduled for creation.

Search and report acceleration methods are described in U.S. Pat. No. 8,589,403, issued on Nov. 19, 2013, and U.S. Pat. No. 8,412,696, issued on Apr. 2, 2011, both of which are hereby incorporated by reference in their entirety for all purposes.

3.0. Clustered Operating Environment

It should be appreciated that, to achieve high availability and to provide for disaster recovery of data stored in a system such as the data intake and query system illustrated in FIG. 1, the system may be configured to operate as a cluster. A clustered data intake and query system as described herein generally may include multiple system components (e.g., forwarders, indexers, data stores, and/or search heads) configured to operate together in a coordinated fashion. To provide for high availability and disaster recovery in a clustered system, data processed and stored by an indexer in a data store may be replicated across one or more other indexers and data stores of the cluster according to a user configurable data replication policy. In one embodiment, a specialized cluster component, referred to herein as a master node, may be configured to coordinate various aspects of replicating data across data stores of the cluster and performing searches against data that has been replicated in a cluster.

There are many options for how data may be replicated in a cluster and, in one embodiment, the manner in which data is replicated in a particular cluster may be based in part on a user configurable data replication policy. One configurable component of a data replication policy may be referred to as a "replication factor." The replication factor for a cluster is a value indicating a number of copies of each data subset, or bucket, created by an indexer that are to be stored across other indexers and in separate data stores of the cluster. For example, a cluster configured with a replication factor of two (2) indicates that for each data bucket created by an indexer, one additional copy of the bucket is to be created and stored by a different indexer of the cluster. Similarly, a cluster configured with a replication factor of four (4) indicates that each data bucket created by an indexer is to be replicated by three additional indexers of the cluster. In this manner, a cluster configured with a particular replication factor generally can tolerate a concurrent failure of a number of indexers that is one less than the replication factor.

As indicated above, when an indexer receives data from a forwarder, the indexer may store the data in one or more grouped subsets, or buckets, each corresponding to a time range associated with the data in the bucket. Each bucket created by an indexer (or heavy forwarder) may contain at least two types of files: event data extracted from the raw data and, optionally, a key word index that enables searches to be performed on the event data. In one embodiment, each replicated copy of a bucket created according to a data replication policy may either be searchable, meaning the bucket includes a copy of the key word index, or non-searchable, meaning the bucket includes only a copy of the event data and is not immediately searchable. To determine a number of searchable copies of each bucket to store the cluster, a data replication policy may further be configured with a "search factor." A search factor is similar to a replication factor except that it indicates a number of searchable copies of each bucket to store in the cluster. For example, a cluster may be configured with a search factor of one (1), indicating that only one of the copies of a bucket is to include a key word index. However, if a search factor of greater than one is configured, some or all of the indexers storing a replicated copy of a bucket also may generate index files for the buckets they are replicating, or the indexers may receive a copy of the index files from another indexer.

A cluster may be configured with a different replication factor and search factor. For example, a particular cluster may be configured with a replication factor of three (3) and a search factor of two (2). Based on this example data replication policy, the cluster maintains three copies of each bucket in the cluster; however, only two of the copies of each bucket contain index files and are therefore capable of responding to search requests. The indexers storing the third copy of each bucket that does not include the index files may not be able to respond to search requests, but the bucket can be made searchable at a later time by causing the indexer storing the bucket to generate the appropriate index files or to receive the index files from another indexer. For example, a non-searchable copy of a bucket may be made searchable due to one or more indexers storing a searchable copy of the bucket experiencing a failure.

As indicated above, a cluster configured with a data replication policy causes replicated copies to be stored of each bucket created by an indexer of the cluster. When a search query is received by a search head associated with the cluster, the search head may distribute the search query to all of the indexers of a cluster. However, if multiple indexers in the cluster store copies of one or more buckets that contain data that partially satisfies the search query, duplicate search results may be returned to the search head. To ensure that only one indexer of a cluster returns results from each bucket when multiple copies of the buckets exist in the cluster, one indexer is designated as the "primary" indexer for each bucket while other indexers storing copies of the same bucket are designated as "secondary" indexers. An indexer that is designated as the primary indexer for a bucket has primary responsibility for returning results from that bucket that are responsive to search queries received by the primary indexer, while secondary indexers do not respond to search queries with results from secondary copies of the same bucket. In other words, when a indexer of a cluster receives a search query from a search head, the indexer finds events in buckets for which the indexer is the primary indexer and that satisfy the search query criteria. In an alternative embodiment, the other indexers storing copies of the same bucket are simply not designated as the primary indexer for the bucket.

For each bucket that is replicated across multiple indexers of a cluster, the designation of one indexer as the primary indexer and other indexers as secondary indexers may change over time. In one embodiment, a mapping of cluster indexers as either the primary indexer or a secondary indexer for each bucket may be represented using the concept of a "generation." In general, a generation represents a "snapshot" of the cluster at a particular point in time and identifies which indexers are primary and which indexers are secondary for each bucket and replicated copy of a bucket stored in the cluster. A centralized "master node" of the cluster may be responsible for creating a generation mapping and distributing the generation mapping to other components of the cluster.

A master node may create multiple different generations with different mappings over time as conditions within the cluster change. Each generation may be identified by a unique generation identifier represented, for example, by a monotonically increasing counter or other set of unique values. For example, a first generation may be represented by a generation identifier of zero (generation 0), a second generation represented by a generation identifier of one (generation 1), and so forth. Thus, for a first generation 0, a particular indexer X of a cluster may be designated as the primary indexer for a particular bucket Z that is replicated across a number of indexers in the cluster. At a later time, a new generation 1 may be created and a different indexer Y instead may be designated as the primary indexer for the same bucket Z. A master node may create new generations and corresponding generation identifiers in response to a number of different cluster events including, but not limited to, any of: the master node initializing, a new indexer joining the cluster, a current indexer failing or leaving the cluster, to rebalance the buckets of a cluster, etc.

Figure 5:
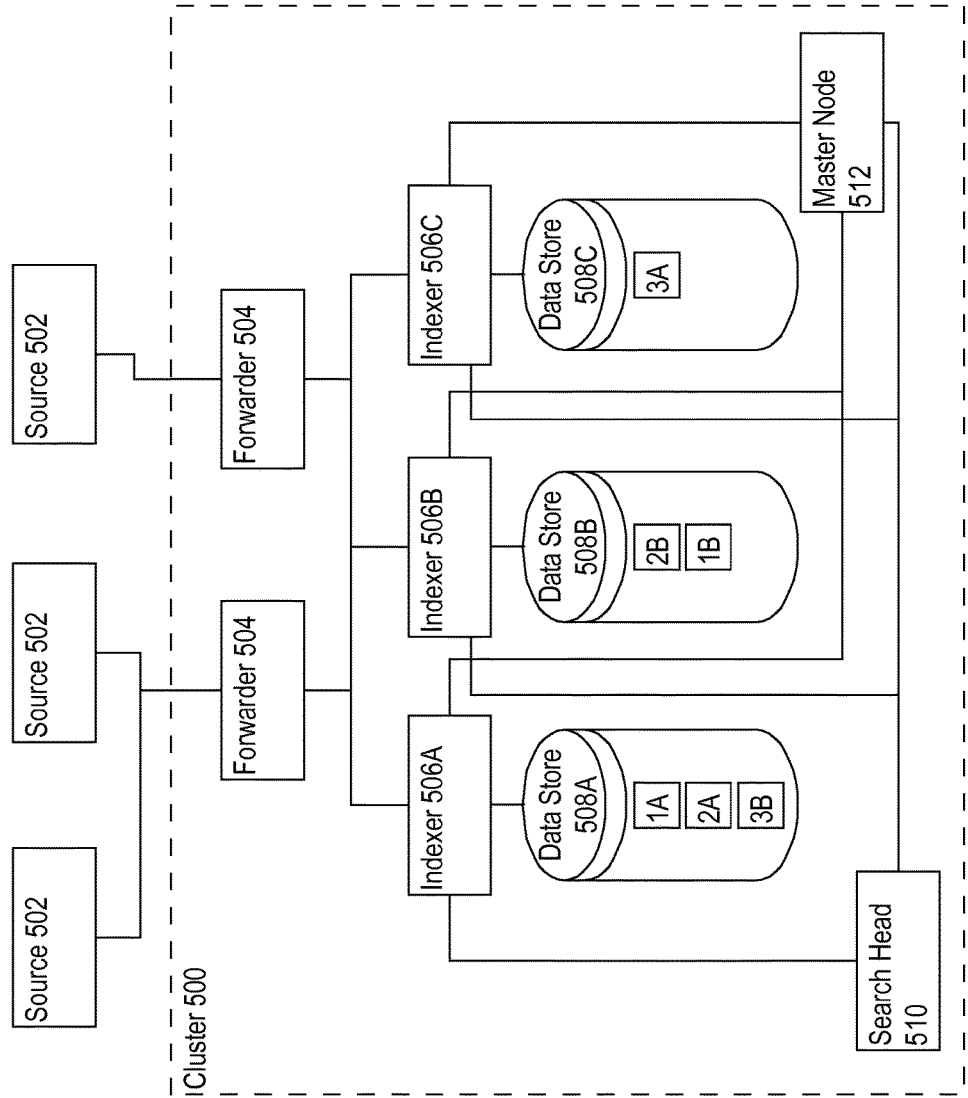
FIG. 5 illustrates an example block diagram of a clustered data intake and query system, according to an embodiment of the invention.

FIG. 5 shows a block diagram of an example embodiment of a clustered data intake and query system, according to one embodiment. Similar to the system 100 of FIG. 1, cluster 500 includes one or more forwarders 504 that collect data from a variety of different data sources 502 and which determine which indexer or indexers (e.g., one or more of indexers 506A-506C) are to receive the data. An indexer 506A-506C receiving data from a forwarder 504 may perform various operations to process, index, and store the data in a corresponding data store 508A-508C. The data processed by an indexer 506A-506C may be stored in a corresponding data store 508A-508C in one or more grouped subsets, or buckets, that correspond to various time ranges. For example, each of data stores 508A-508C is depicted in FIG. 5 as storing one or more example buckets 1A, 1B, 2A, 2B, 3A, and 3B. In this example, "A" and "B" versions of a bucket represent copies of the same bucket.

In cluster 500, a search head 510 is responsible for distributing search queries received from clients to indexers 506A-506C and consolidating any search results received from the indexers. For example, a search head 510 may distribute a search query to indexers 506A-506C which perform the actual searches against the buckets stored by the indexers in data stores 508A-508C.

To perform a search against data stored by cluster 500, in one embodiment, a search head 510 may first obtain information from master node 512 including a list of active indexers and a generation identifier. As indicated above, a generation identifier identifies a particular generation mapping which indicates, for each bucket in the cluster, which indexer is the primary indexer and which indexers are secondary indexers.

The search head 512 may distribute the search query to all of the active indexers along with the generation identifier. Each indexer receiving the search query may use the generation identifier to identify which generation mapping to consult when searching the buckets stored by the indexer. In other words, based on the generation information corresponding to the received generation identifier, each indexer searches for event results in buckets for which the indexer is the primary indexer and which satisfy the search query criteria. After processing the search query, each indexer may send a response to search head 510 either including event results or indicating that the indexer has zero event results satisfying the search criteria based on the generation information. The response from each indexer may further include metadata information indicating an amount of time that elapsed to process the search and/or other diagnostic information. If a search head 510 does not receive a response from one or more of the indexers to which the search query was distributed, the search head 510 may generate an alert indicating that a response was not received from the indexer(s) and that the search results therefore may be incomplete.

Typically, a search head 510 performs a search query with respect to the most recent generation created by the master node. However, in some cases where one or more queries take an abnormally long time to process, it is possible that indexers of a cluster could be processing a search query based on a generation that is earlier than the current generation. Those same indexers could receive a subsequent search query that is based on the current generation and therefore concurrently process two separate queries based on different generations.

In one embodiment, a master node 512 may be configured to maintain an approximately equal number of buckets on each indexer, and to maintain an approximately equal number of buckets for which each indexer has primary responsibility. Without an even distribution of buckets and primary indexer responsibilities, it may be possible that individual indexers have primary responsibility for more buckets than others and may become overloaded if a sufficiently large number of queries are submitted near in time to one another. A master node 512 may periodically rebalance buckets by determining how many buckets are currently stored by each indexer and which indexers are primary indexers for each bucket, and create a new generation where the number of buckets for which each indexer has primary responsibility is approximately the same.

Figure 6:
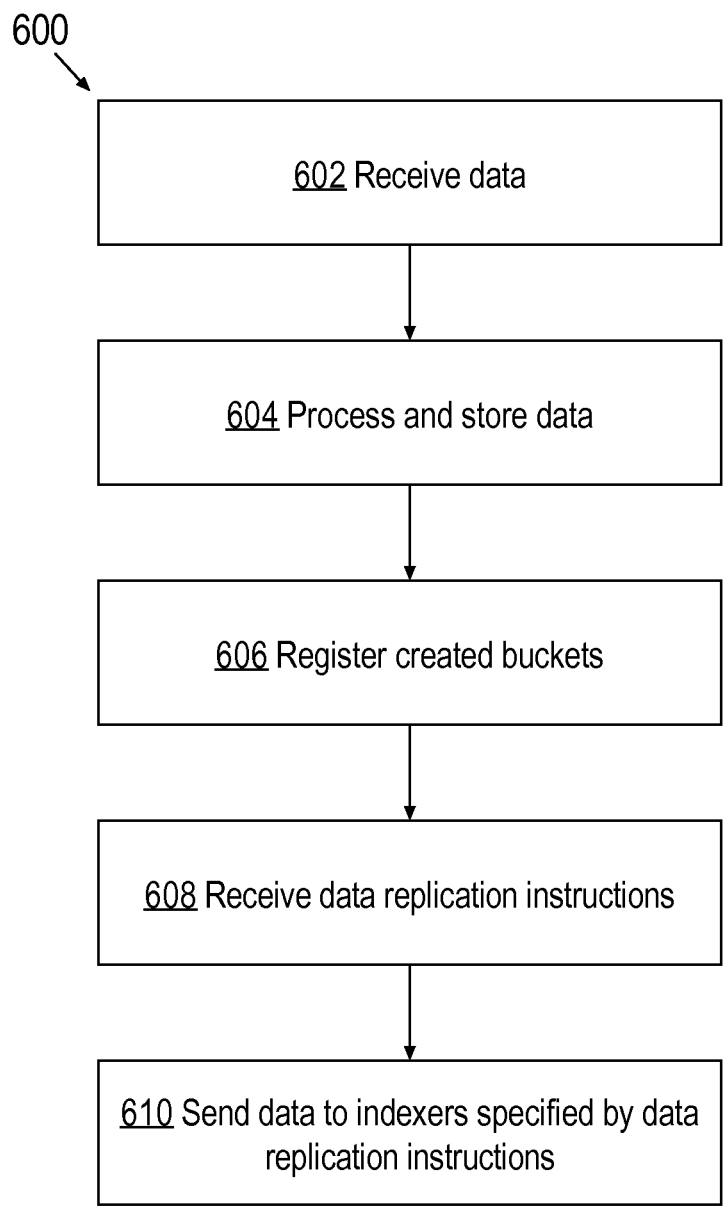
FIG. 6 illustrates a flowchart of a process that indexers may use to replicate data in a clustered data intake and query system, according to an embodiment of the invention.

FIG. 6 illustrates a flowchart of a process that indexers may use to replicate data in a clustered data intake and query system, according to an embodiment. At block 602, an indexer (e.g., one of indexers 506A-506C) receives data from a forwarder 504. At block 604, the indexer processes and stores data in a corresponding data store 508A-508C. Processing the data by an indexer, for example, may include one or more of the steps of segmenting, transforming, and indexing the data, as described in steps 204-216 of FIG. 2. As indicated above, the data may be stored by the indexer in a data store in one or more grouped subsets, or buckets, of the data received from the forwarder.

At block 606, the indexer registers any newly created buckets with master node 512. Master node 512 may store information about the newly created buckets as part of the current generation information, or the master node 512 may create a new generation that includes information for the newly created buckets. The master node 512 generates, based on a configured data replication policy for the cluster, data replication instructions that include a list of "peer" indexers in the cluster that are to store a replicated copy of the one or more registered buckets. As indicated above, the number of peer indexers that are selected to store a replicated copy of the one or more registered buckets correspond to a replication factor configured for the cluster. The selection of particular peer indexers for storing replicated bucket copies may be further based in part on load balancing criteria or other factors determined by the master node 512. The data replication instructions may also include, for each of the selected peer indexers, whether the peer indexer is to store a searchable or non-searchable copy of each bucket. The master node 512 sends the data replication instructions to the indexer registering the buckets.

In block 608, the indexer receives the data replication instructions including the list of peer indexers to store replicated copies of the buckets created by the indexer. In block 610, the indexer forwards the data to the peer indexers, each of which stores the data in a corresponding data store and, if the peer indexer is storing a searchable copy, processes the data to generate a separate key word index. The data forwarded to the peer indexers may include the raw data received from the forwarder, the event data as processed by the indexer, or any combination thereof.

Referring again to FIG. 5, to illustrate one example of a cluster with data stored according to a data replication policy, each of data stores 508A-508C is depicted storing one or more of the buckets labeled 1A, 2A, 1B, 2B, 3A, and 3B. The example cluster 500, for example, may be configured with a replication factor of two (2). As indicated above, an "A" version of a bucket represents an original version of the bucket, whereas a "B" version represents a replicated copy of the same data bucket. For example, indexer 506A may have received data from a forwarder 504 which indexer 506A processed and stored in the bucket labeled 1A. After registering the bucket 1A with master node 512 and based on received data replication instructions, indexer 506A forwarded the data for bucket 1A to indexer 506B which stored a copy of the data in the bucket labeled 1B. Similarly, indexer 506C may have received data from a forwarder 504 and stored the data in the bucket labeled 3A. Based on replication instructions received from master node 512, indexer 506C forwarded the data for bucket 3A to indexer 506A which stored a copy of the data in the bucket labeled 3B.

Because the example data replication policy for cluster 500 is configured with a replication factor of two (2), as illustrated above, two copies of each bucket are stored by separate components of the cluster. In this manner, if any one of indexers 506A-506B were to experience a failure, at least one copy of each bucket in the cluster still exists somewhere in the cluster. In response to such a failure, master node 512 may create a new generation that, if necessary, reorganizes the designation of particular indexers in cluster 500 as the primary indexer for each bucket so that a searchable copy of each bucket is available without disruption. Techniques for managing data in a cluster environment are described in U.S. patent application Ser. No. 13/648,116, filed on Oct. 9, 2012, U.S. patent application Ser. No. 13/662,358, filed on Oct. 26, 2012, and U.S. Provisional Patent Application No. 61/647,245, filed on May 15, 2012, each of which is hereby incorporated by reference in their entirety for all purposes.

4.0 Multi-Site Clusters

As indicated above, a cluster may be configured to replicate data in the cluster across multiple indexers of the cluster to improve the availability of the data and to provide for disaster recovery of data in the cluster. However, if all of the indexers of a cluster are geographically co-located at the same site (e.g., within a single data center or office building), the benefits of data replication may be negated upon the occurrence of a failure that affects the entire site. For example, a site-wide failure caused by a major power outage, natural disaster, or a man-made disaster may be capable of entirely disrupting the operation of a cluster if all of the cluster components are located at the same site.

In one embodiment, to further improve the fault tolerance and disaster recovery abilities of a clustered data intake and query system, a cluster may be configured to ensure that replication of data occurs across indexers located at multiple geographically dispersed sites. A cluster that includes the concept of "sites" as part of its data replication policy is referred to herein as a multi-site cluster. A site may refer to a logical grouping of one or more cluster components that may each be associated with a particular geographic location. For example, if a business has two data centers on the east coast and west coast, respectively, a user may define a separate site for each of the data centers and associate particular cluster components with each site depending on where each of the cluster components is located physically.

In one embodiment, in addition to a user configurable replication factor, a data replication policy for a multi-site cluster may further include configuration of a site replication factor. Whereas a replication factor indicates a number of times that each bucket created in a cluster is to be replicated within the cluster, a site replication factor indicates, for each bucket, a number of different sites at which to store a copy of the bucket. For example, a cluster may be configured with five (5) separate sites, a replication factor of four (4), and a site replication factor of three (3). In this example, for each bucket created by an indexer of the cluster, three additional copies of the bucket are to be stored in the cluster, and the four total copies of the bucket are to be stored across at least three different sites of the five sites. In this manner, by configuring a site replication factor of at least two (2) for a multi-site cluster, the cluster may be able to withstand a failure of one or more entire sites.

Figure 7:
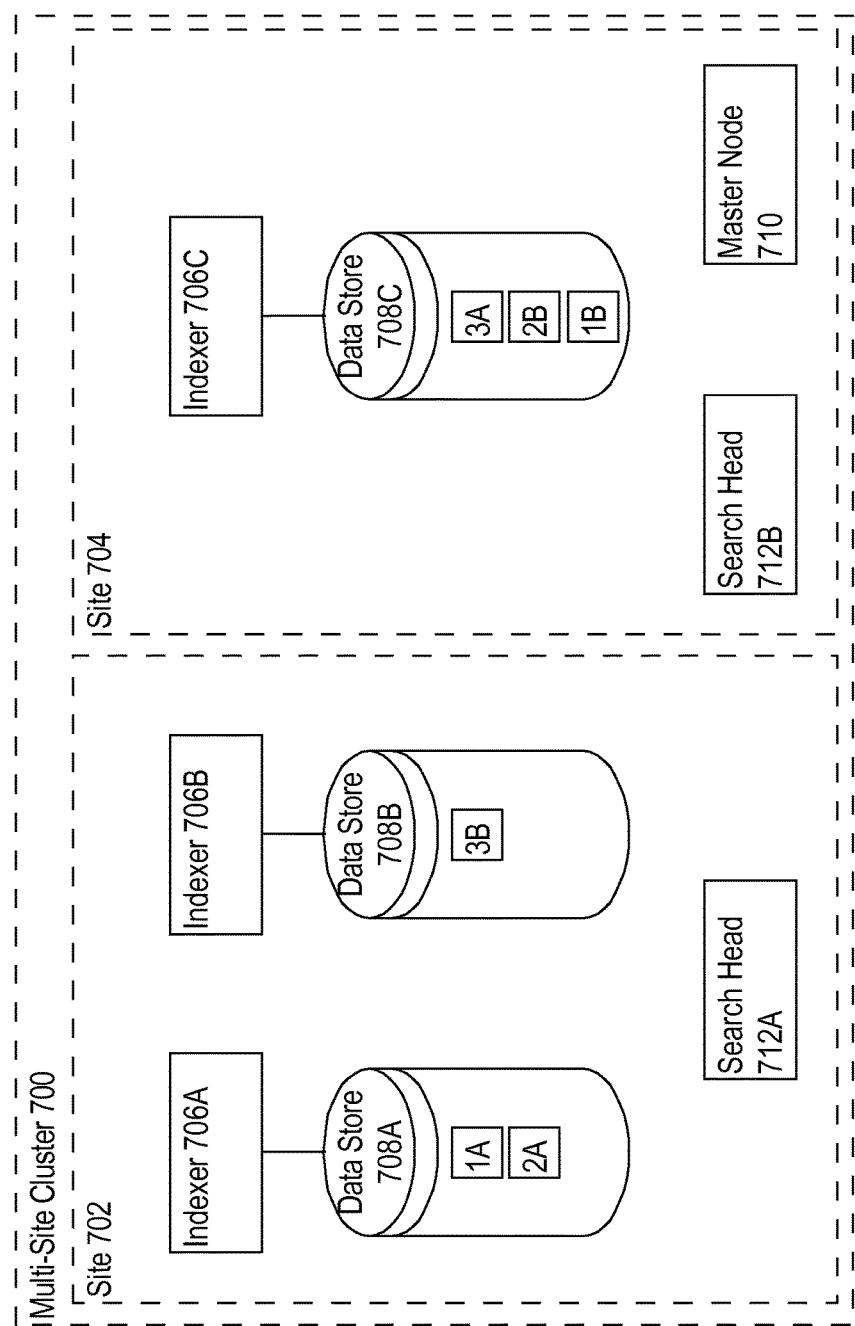
FIG. 7 illustrates an example block diagram of a multi-site clustered data intake and query system, according to an embodiment of the invention.

FIG. 7 illustrates an example of a multi-site cluster 700 that includes two defined sites: a site 702 and a site 704. As indicated above, each of sites 702, 704 may represent an individual data center, office building, or other location that houses one or more components of multi-site cluster 700. Each of indexers 706A-706B, data stores 708A-708B, and search head 712 is associated with site 702. Each of indexer 706C, data store 708C, master node 710, and search head 712 is associated with site 704. Two sites are illustrated in FIG. 7 for the purposes of illustrating a clear example; however, a multi-site cluster generally may include any number of sites, and any number of cluster components associated with each site, depending on a particular implementation and a particular user configuration.

Although not depicted, each of indexers 706A-706C, data stores 708A-708C, master node 710, and search heads 712A-712B may be connected via one or more networks. The networks connected to the cluster components may be implemented by any medium or mechanism that provides for the exchange of data between components of the system 100. Examples of networks that may connect the components of multi-site cluster 700 include, without limitation, a network such as a Local Area Network (LAN), Wide Area Network (WAN), wireless network, the Internet, Intranet, Extranet, etc. Any number of components within the multi-site cluster 700 may be directly connected to each other through wired or wireless communication segments.

Figure 8:
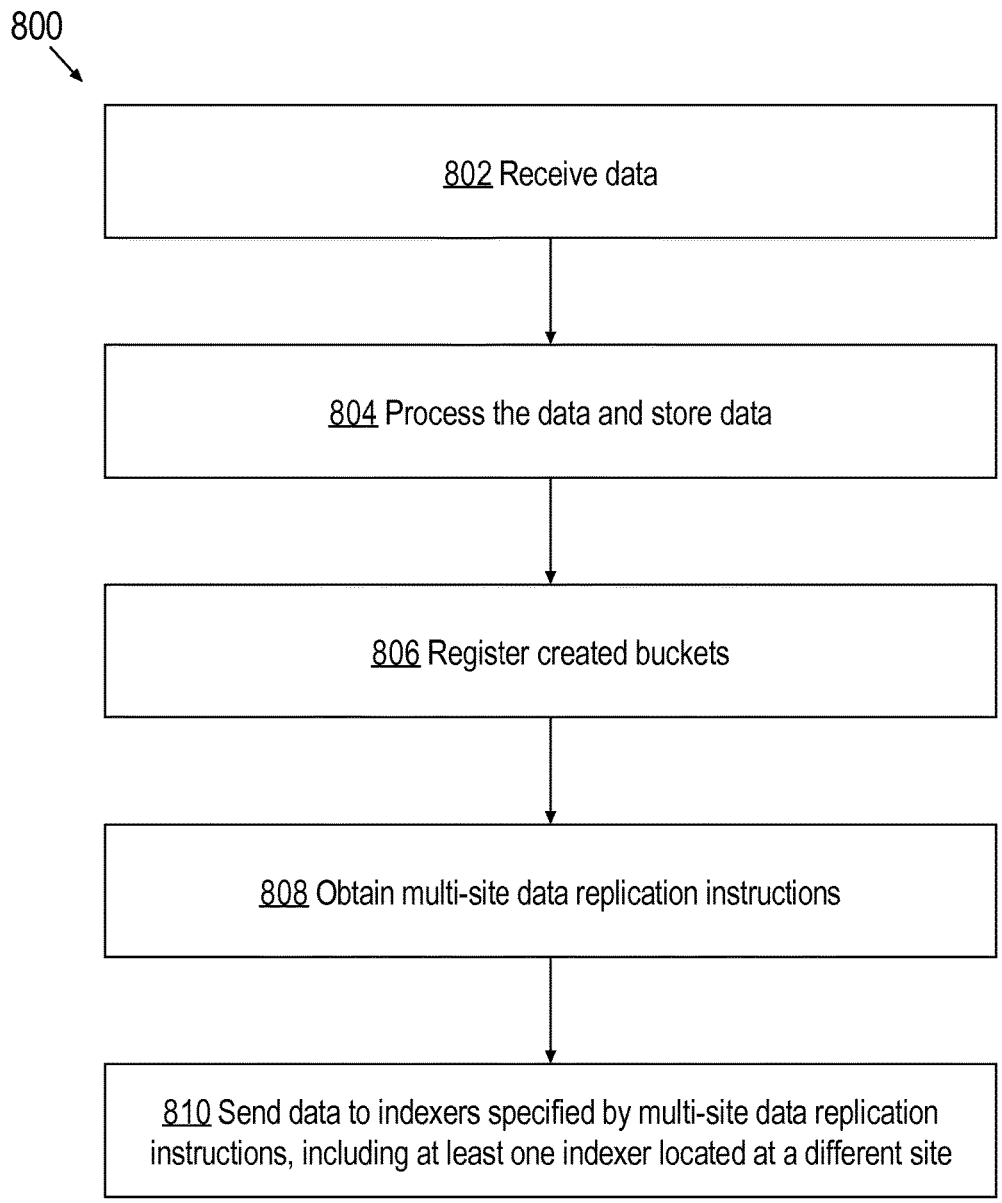
FIG. 8 illustrates a flowchart of a process that indexers may use to process, index, store, and replicate data received from forwarders in a multi-site clustered data intake and query system, according to an embodiment of the invention.

FIG. 8 illustrates a flowchart of a process that indexers may use to replicate data in a multi-site clustered data intake and query system, according to embodiments. In block 802, an indexer (e.g., one of indexers 706A-706C) receives data from a forwarder. At block 804, the indexer processes and stores the data in a corresponding data store 708A-708C. For example, the indexer processing and storing the data may include one or more steps of segmenting, transforming, and indexing the data, as described in reference to FIG. 2.

Figure 9:
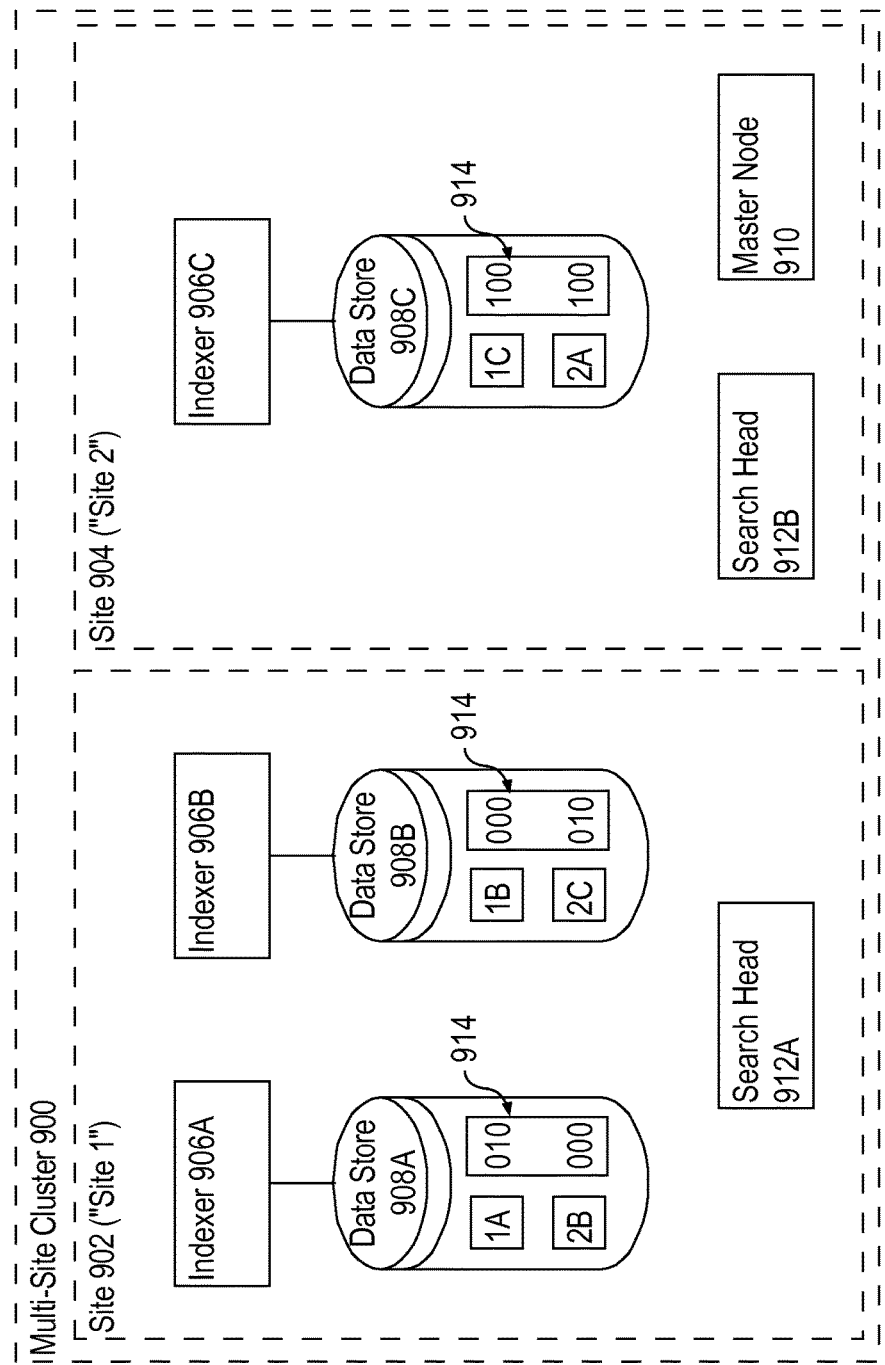
FIG. 9 illustrates an example block diagram of a multi-site clustered data intake and query system that is configured to process search requests based on search affinity information, according to an embodiment of the invention.

At block 806, the indexer registers any newly created buckets with master node 710. As depicted in FIG. 9, in a multi-site cluster, master node 710 may be located at the same site as an indexer, or may be located at a different site. However, in one embodiment, a multi-site cluster includes only one master node 710. Based on multi-site data replication policy information, master node 710 determines one or more "peer" indexers within the cluster to store replicated copies of the newly created buckets registered by the indexer. As indicated above, the selected peer indexers may include one or more indexers that are associated with sites that are different from the indexer registering the newly created buckets, depending on a configured site replication factor. The indexer may also receive instructions (e.g., generation information, etc.) indicating whether the indexer has primary responsibility for searching each bucket stored by the indexer.

At block 808, the indexer obtains multi-site data replication instructions from master node 710. At block 810, the indexer sends the data to the peer indexers selected by master node 710 including at least peer one indexer located at a different site, assuming that a site replication factor of at least two (2) is configured.

To illustrate a particular example of a data replication policy for a multi-site cluster, in FIG. 7 each of data stores 708A-708C is illustrated as storing one or more of the buckets labeled 1A, 2A, 1B, 2B, 3A, and 3B. In the example of FIG. 7, the multi-site cluster 700 may be configured with a multi-site data replication policy that specifies a replication factor of two (2), and is further configured with a site replication factor of two (2). In other words, the example data replication policy configured for multi-site cluster 700 indicates that each bucket created by an indexer 706A-706C is replicated to at least one other indexer, and further, that each bucket is replicated to an indexer that is located at a different site. Similar to FIG. 5, "A" and "B" versions of a bucket represents copies of the same bucket.

For example, indexer 706A may have received data from a forwarder which indexer 706A processed and stored in bucket 1A. After registering bucket 1A and based on replication instructions received from master node 710, indexer 706A forwarded the data for bucket 1A to peer indexer 706C which stored a copy of the data as bucket 1B. In the example of FIG. 7, because the data replication policy specifies a site replication factor of two (2), indexer 706B is not available as a replication target for bucket 1A since creating a copy of bucket 1A at indexer 706B would not result in two copies of bucket 1A at two different sites. As another example, indexer 706C may have received data from a forwarder which indexer 706C processed and stored in the bucket labeled 3A. After registering the 3A bucket and based on received replication instructions, indexer 706C forwarded the data for bucket 3A to indexer 706B which stored a copy of the data in the bucket labeled 3B.

The example illustrated in FIG. 7 is only one particular example of a data replication policy for a multi-site cluster and other configurations may be possible. As another example, replicated storage of buckets in a multi-site cluster may be configured in an asymmetric fashion where one site is responsible for storing all primary copies of data and another site is configured as a backup data center. In this case, one may configure the policy so that all but one copy lives on the primary site and the remaining copies on secondary site.

5.0 Site-Based Search Affinity

As indicated above, a multi-site cluster may be configured to replicate data stored by the cluster across indexers located at multiple geographically dispersed sites to increase the fault tolerance of the cluster against site-wide failures, among other benefits. As illustrated in FIG. 7, a multi-site cluster may include multiple sites that each logically group one or more components of the cluster. For example, the components of a multi-site cluster may include one or more search heads and which may be located at one or more of the sites. Because data in a multi-site cluster, and primary responsibility by indexers for that data, may be distributed across indexers located at a number of different sites, a search head may distribute search queries and receive results from indexers located at multiple sites. However, the distribution of search queries to indexers located at multiple geographically dispersed sites may introduce undesirable latency into the search process that is not present when a search head is co-located with all of the indexers of a cluster.

To reduce network traffic and latency when performing searches on data that is stored by indexers located at multiple sites, in one embodiment, a multi-site cluster may be configured such that indexers that are co-located with a search head from which a search query originates are more likely to return any search results that satisfy the query. To cause indexers that are co-located with a search head to be more likely to return search results for queries originating from that search head, in one embodiment, each indexer may store "search affinity" information. Search affinity information indicates, for each bucket stored by a particular indexer and for each site from which a query may originate, whether the particular indexer has primary responsibility for returning search results for that bucket for searches originating at search heads within that site. In other words, whether a given indexer has primary responsibility for returning search results for a particular bucket may depend on the site from which the query originated, and the search infinity information may indicate this for the particular bucket for each possible site from which the query may originate. Search affinity information for a multi-site cluster may be created and maintained by a master node for the cluster, similar to generation information, and may change over time as conditions within the cluster change, as described herein.

In one particular embodiment, search affinity information may be represented by a collection of bitmasks, where each bitmask of the collection is associated with an indexer/bucket pair. For each particular indexer/bucket pair, a bitmask may provide an encoded representation indicating zero or more sites of query origination for which the particular indexer has primary responsibility for responding to search queries for that bucket. For example, a search affinity bitmask may be represented as a string of binary digits, where each individual digit in the string indicates to an indexer whether the indexer has primary responsibility for a bucket for searches originating from a particular site.

As one example, a particular multi-site cluster may consist of three (3) separate sites identified by a number: site 1, site 2, and site 3. To indicate for a particular indexer-bucket pair that the indexer has primary responsibility for the bucket for searches originating from site N, a bitmask may be formed with a value of 1 at the $2^N$ position in the binary string. For example, if a master node determines that an indexer X is to have primary responsibility for a bucket Y for searches originating from site 1 (for example, because indexer X is also located at site 1), the master node may generate a bitmask for the indexer X-bucket Y pair with a 1 in the $2^1$ position (0010). Similarly, if indexer X is to have primary responsibility for bucket Y for searches originating from site 2, the master node may generate a bitmask for the indexer X-bucket Y pair with a 1 in the $2^2$ position (0100), and so forth. If a particular indexer-bucket pair is not to have primary responsibility for searches originating from any site, a master node may generate a bitmask of all zeroes (0000) for the particular indexer-bucket pair.

Although the examples above illustrate bitmasks that indicate that an indexer has primary responsibility for a bucket for searches originating from only a single site, a search affinity bitmask may indicate that an indexer has primary responsibility for a particular bucket for searches originating from multiple sites. For example, an indexer X-bucket Y pair may be associated with a bitmask of 0110, indicating that indexer X has primary responsibility for bucket Y for searches originating from either site 1 or site 2. In general, any combination of search affinity bitmasks may be configured depending on the characteristics of a particular cluster and/or a user configuration.

In an embodiment, search affinity information may be created by a master node and distributed to each indexer of a multi-site cluster for storage by the indexers, similar to distribution of bucket generation information for clusters. Also similar to bucket generation information, search affinity information may change over time as conditions within the cluster change and successive iterations of the search affinity information may be identified by generation identifiers. For example, first search affinity information created by a master node may be identified by a label "generation 0", second search affinity information may be identified by a label "generation 1", and so forth. A master node may create new generations of search affinity information and corresponding generation identifiers in response to a number of different cluster events including, but limited to, any of: the master node initializing, a new indexer joining the cluster, a current indexer failing or leaving the cluster, to rebalance the buckets of a cluster, etc. Indexers may store multiple generations of search affinity information.

In an embodiment, when a search head distributes a search query to indexers of a cluster, the search head may also send a site identifier which indicates the site at which the search head is located. The search head may also distribute a generation identifier that identifies particular search affinity information stored by the indexers. In this manner, when an indexer receives a search from a particular search head, the indexer may use the site identifier and the search affinity information identified by the generation identifier to determine, for each bucket stored by the indexer, whether the indexer has primary responsibility for searches originating from the site identified by the site identifier.

FIG. 9 illustrates an example block diagram of a multi-site clustered data intake and query system that is configured to process search requests based on search affinity information, according to an embodiment. In FIG. 9, a multi-site cluster 900 includes a site 902 and a site 904. Each of sites 902, 904 includes one or more of the cluster components including indexers 906A-906C, data stores 908A-908C, search heads 912A, 912B, and a master node 910.

Each of indexers 906A-906C is depicted as storing one or more of the buckets labeled 1A, 1B, 1C, 2A, 2B, and 2C in a corresponding data store 908A-908C. Similar to FIG. 5 and FIG. 7, an "A", "B", and "C" version of a bucket represent replicated copies of the same bucket. In the example of FIG. 9, the multi-site cluster 900 may be configured with a replication factor of three (3) and a site replication factor of two (2). Thus, for example, three separate copies of each of buckets 1 and 2 exist in the cluster and at least two separate copies of each bucket are stored at two different sites In FIG. 9, each of data stores 908A-908C is illustrated as storing search affinity information 914. The search affinity information 914 may have been received and stored by each indexer, for example, when the indexers 906A-906C registered the created buckets with master node 910, periodically received from master node 910, and/or the search affinity information 914 may be included as part of a search query distributed by search head 912A. As indicated above, in one embodiment, the search affinity information may include a collection of bitmasks for each indexer-bucket pair where each digit of a bitmask represents whether the indexer has primary responsibility for the bucket for searches originating from a particular site. In FIG. 9, only those search affinity identifiers relevant to each indexer are illustrated in each of the data stores 908A-908C; however, each indexer may receive and store search affinity identifiers for the entire cluster, or only those search affinity identifiers that are associated with buckets stored by the particular indexer.

Figure 10:
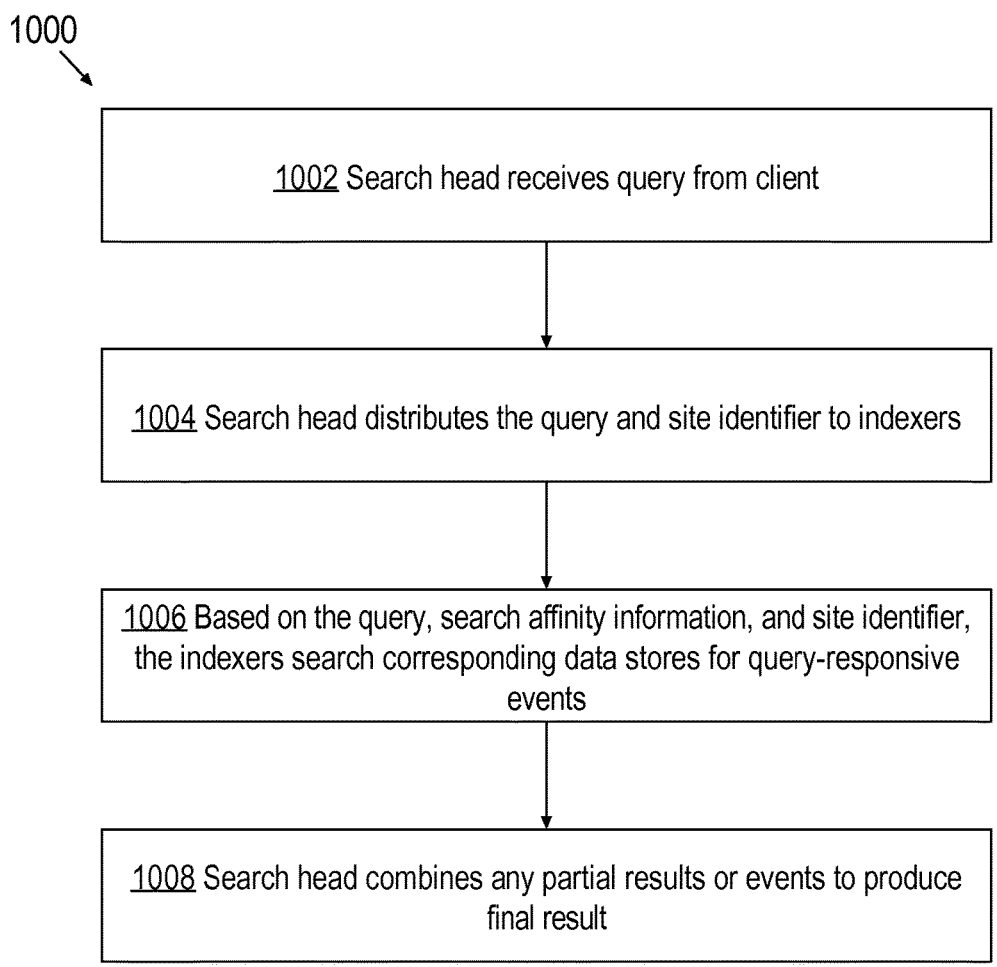
FIG. 10 illustrates a flowchart of an example process that a search head and indexers perform during a search query using search affinity information, according to an embodiment of the invention.

FIG. 10 is a flowchart 1000 of a process that a search head and indexers of a multi-site cluster may perform during a search query according to search affinity information. In block 1002, a search head (e.g., search head 912A or 912B) receives a search request from a client. In block 1004, the search head distributes the query and a site identifier to indexers (e.g., indexers 906A-906C) of the multi-site cluster. The site identifier indicates the site at which the search head distributing the query is located. The site identifier may be included with the query, or may be sent separately. The search head may also send a generation identifier that identifies particular search affinity information for the indexers to use when processing the query. For example, the indexers may store multiple generations of search affinity information and the generation identifier may identify a particular generation of search affinity information to use for the query.

In block 1006, based on the query, search affinity information, and the site identifier, each of the indexers to which the query was distributed searches a corresponding data store for event results responsive to the query. As indicated above, each indexer may store search affinity information that indicates, for each bucket stored by the indexer, whether the indexer has primary responsibility for the bucket for searches originating from particular sites. The indexers may use the site identifier sent by the search head to determine the originating site of the query for comparison to the search affinity information. For example, if an indexer receives a query and a site identifier indicating that the originating search head is at site 2, the indexer may search buckets that are associated with a bitmask with a 1 in the $2^2$ position (0010).

In block 1008, the search head combines or reduces all of the partial results or events received from the indexers together to determine a final result responsive to the query.

Referring again to FIG. 9, search head 912A may distribute a search query to indexers 906A-906C and include with the query a site identifier of 1. When indexer 906A receives the search query from search head 912A, indexer 906A may consult search affinity information 914 to determine whether indexer 906A stores any buckets associated with a bitmask having a value of 1 in the $2^1$ position (010). For example, indexer 908A may determine that bucket 1A is associated with a bitmask having a 1 in the $2^1$ position. Thus, in response to the query from search head 912A, indexer 906A may return one or more event results from bucket 1A if any of the data in bucket 1A is responsive to the search query. Similarly, because bucket 2B is associated with a bitmask that includes a 0 in the $2^1$ position, indexer 906A does not return any results from bucket 2B, even if bucket 2B contains event results that are responsive to the query.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

6.0 Implementation Mechanisms

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
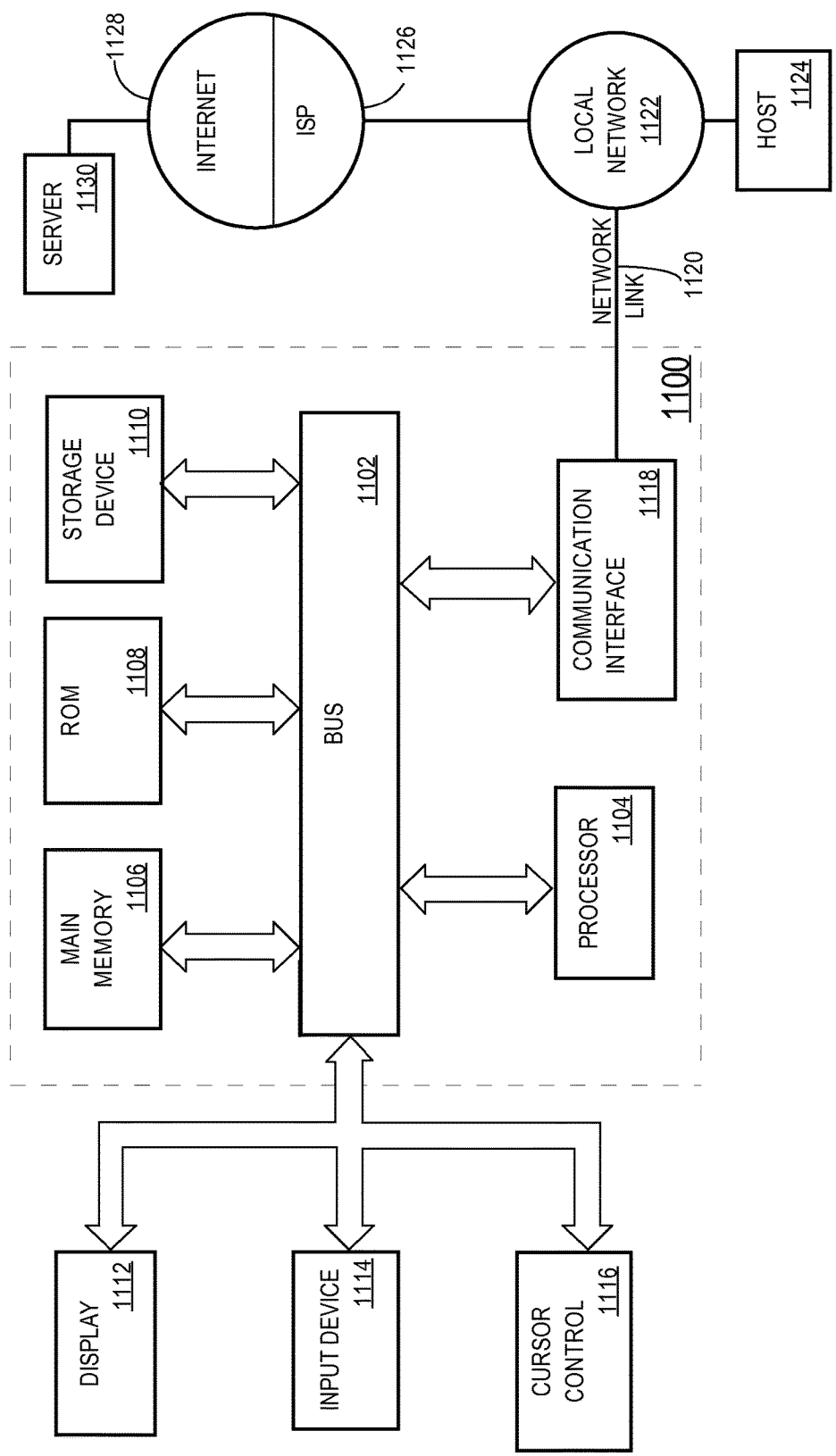
FIG. 11 illustrates a computer system upon which an embodiment may be implemented.

For example, FIG. 11 is a block diagram that illustrates a computer system 1100 upon which an embodiment may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

7.0 Example Embodiments

In an embodiment, a method or non-transitory computer readable medium comprises: receiving, at an indexer, a set of search affinity identifiers, each search affinity identifier indicating, for each of a plurality of sites from which a query may originate, whether the indexer has primary responsibility for responding to queries from that site for a particular subset of data accessible to the indexer; receiving, from a first search head, (i) a first query to search a subset of data accessible to the indexer, and (ii) a first site identifier identifying a first site at which the first search head is located; determining, based on both the first site identifier and a particular search affinity identifier of the set of search affinity identifiers, that the indexer is to respond to the first query with a result from searching the subset of data; sending, to the first search head, the result from searching the subset of data.

In an embodiment, the method or computer readable medium further comprises: wherein determining that the indexer is to respond to the first query with a result from searching the subset of data includes determining that the indexer has primary responsibility for responding to queries for the subset of data for the first site.

In an embodiment, the method or non-transitory computer readable medium further comprises: receiving, at the indexer, a second query from a second search head to search the subset of data, the second query including a second site identifier identifying a second site at which the second search head is located; determining, based on both the second site identifier and the particular search affinity identifier of the set of search affinity identifiers, that the indexer is not to respond to the second query with a result from searching the subset of data; wherein each of the first site and the second site represents a collection of computing resources located at a different geographic location from the other site.

In an embodiment, the method or non-transitory computer readable medium further comprises: wherein the particular search affinity identifier is a bitmask, and wherein each digit of the bitmask represents a particular site of a plurality of sites.

In an embodiment, the method or non-transitory computer readable medium further comprises: receiving, at the indexer, a second query from a second search head to search the subset of data, the second query including a second site identifier identifying a second site at which the second search head is located; determining, based on both the second site identifier and the particular search affinity identifier of the set of search affinity identifiers, that the indexer is not to respond to the second query with a result from searching the subset of data; wherein the first query and the second query are identical.

In an embodiment, the method or non-transitory computer readable medium further comprises: receiving, at the indexer, a second query from a second search head to search the subset of data, the second query including a second site identifier identifying a second site at which the second search head is located; determining, based on both the second site identifier and the particular search affinity identifier of the set of search affinity identifiers, that the indexer is not to respond to the second query with a result from searching the subset of data; wherein the first query and the second query are different.

In an embodiment, the method or non-transitory computer readable medium further comprises: receiving, at the indexer, raw data; separating the raw data into a plurality of events included in the subset of data; determining, for each event in the plurality of events, a time stamp; and storing the subset of data in a data store.

In an embodiment, the method or non-transitory computer readable medium further comprises: receiving, at the indexer, raw data; separating the raw data into a plurality of events included in the subset of data; storing the subset of data in a data store; identifying a replication factor that indicates a number of times that the subset of data is to be replicated; and sending the subset of data to a number of other indexers, wherein the number corresponds to the replication factor.

In an embodiment, a method or non-transitory computer readable medium comprises: receiving, at the indexer, raw data; separating the raw data into a plurality of events included in the subset of data; storing the subset of data in a data store; identifying a site replication factor that indicates a number of sites at which the subset of data is to be replicated; and sending the subset of data to second indexers located at the number of sites.

In an embodiment, a method or non-transitory computer readable medium comprises: wherein the set of search affinity identifiers is associated with a first generation identifier; receiving, at the indexer, a second set of search affinity identifiers associated with a second generation identifier.

In an embodiment, a method or non-transitory computer readable medium comprises: wherein the indexer stores a plurality of sets of search affinity identifiers, and wherein each set of search affinity identifiers of the plurality of sets of search affinity identifiers is associated with a generation identifier; receiving, from the first search head, a particular generation identifier identifying the particular set of search affinity identifiers of the plurality of sets of search affinity identifiers.

In an embodiment, a method or non-transitory computer readable medium comprises: receiving data at an indexer associated with a first site; storing, by the indexer, at least one grouped subset of the data in a data store accessible by the indexer; receiving data replication instructions including a list of one or more peer indexers, the one or more peer indexers including at least one peer indexer associated with a second site; and sending the at least one grouped subset of the data to the one or more peer indexers; receiving instructions indicating whether the indexer has primary responsibility for searching in the data store to which the indexer has access the at least one grouped subset of the data.

In an embodiment, the method or non-transitory computer readable medium further comprises: wherein one or more peer indexers include peer indexers located at a number of sites, and wherein the number of sites corresponds to a site replication factor.

In an embodiment, the method or non-transitory computer readable medium further comprises: wherein each of the first site and the second site represents a collection of computing resources located at a different geographic location from the other site.

In an embodiment, the method or non-transitory computer readable medium further comprises: wherein sending the at least one grouped subset of the data to the one or more peer indexers causes the one or more peer indexers to store the at least one grouped subset of the raw data in one or more separate data stores.

In an embodiment, the method or non-transitory computer readable medium further comprises: separating the data into a plurality of events, and wherein the at least one grouped subset of the data includes one or more of the plurality of events.

In an embodiment, the method or non-transitory computer readable medium further comprises: wherein the at least one grouped subset corresponds to a particular time span.

In an embodiment, the method or non-transitory computer readable medium further comprises: sending to each peer indexer to which data is replicated, based on the replication instructions, an indication of whether the peer indexer is to store a searchable or non-searchable copy of the data.

In an embodiment, the method or non-transitory computer readable medium further comprises: wherein the replication instructions specify a number of peer indexers for replicating the data, and wherein the number of peer indexers corresponds to a user configured replication factor.

In an embodiment, the method or non-transitory computer readable medium further comprises: receiving generation information indicating whether the indexer has primary responsibility for responding to queries for the at least one grouped subset of the data, and wherein the generation information is associated with a generation identifier.

In an embodiment, the method or non-transitory computer readable medium further comprises: wherein the instructions include search affinity information indicating whether the indexer has primary responsibility for responding to queries originating from the first site for the at least one grouped subset of the data, and wherein the search affinity information is associated with a generation identifier.

8.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the depicted systems may feature an open port, API, or other suitable communication interface by which the component may become communicatively coupled to other components of the depicted systems as needed to accomplish any of the functions of the systems described herein.

What is claimed is:

1. A method, comprising:
generating, at a master node, configuration data for each indexer of a cluster of indexers under coordination by the master node, wherein the cluster of indexers is distributed across one or more sites, wherein configuration data for a particular indexer of the cluster of indexers indicates whether the particular indexer is a primary indexer with primary responsibility for responding to search queries originating from one or more search heads, wherein each of the one or more sites comprises a plurality of indexers of the cluster, wherein each indexer is operable to store multiple subsets of searchable data, and wherein each subset of searchable data is operable to be replicated across multiple indexers at the one or more sites, and wherein, in response to a search query, each indexer is configured to use configuration data received from the master node to search associated subsets of searchable data for which it has primary responsibility;
sending, to each indexer of the cluster of indexers, configuration data generated for a respective indexer, wherein the configuration data further indicates whether a particular indexer is a secondary indexer with secondary responsibility for responding to the search queries related to searchable data replicated between the primary indexer and the secondary indexer.

2. The method of claim 1, wherein the primary indexer responds with one or more results based on data from one or more subsets of searchable data accessible to the primary indexer.

3. The method of claim 1, wherein the configuration data further indicates, for each particular subset of searchable data accessible to the primary indexer and for each particular site of the one or more of sites, whether the primary indexer has primary responsibility for responding to search queries originating from the particular site with one or more results based on data from the particular subset of searchable data.

4. The method of claim 1, further comprising associating a generation identifier with the configuration data generated for each indexer of the cluster of indexers.

5. The method of claim 1, further comprising:
associating a generation identifier with the configuration data generated for each indexer of the cluster of indexers;
in response to determining that a condition associated with the cluster of indexers has changed, generating new configuration data for one or more indexers of the cluster of indexers;
associating a new generation identifier with the new configuration data;
sending the new configuration data to the one or more indexers of the cluster of indexers.

6. The method of claim 1, further comprising:
associating a generation identifier with the configuration data generated for each indexer of the cluster of indexers;
in response to detecting that a new indexer has joined the cluster of indexers, generating new configuration data for one or more indexers of the cluster of indexers;
associating a new generation identifier with the new configuration data;
sending the new configuration data to the one or more indexers of the cluster of indexers.

7. The method of claim 1, further comprising:
associating a generation identifier with the configuration data generated for each indexer of the cluster of indexers;
in response to detecting that an indexer of the cluster of indexers has failed, generating new configuration data for one or more indexers of the cluster of indexers;
associating a new generation identifier with the new configuration data;
sending the new configuration data to the one or more indexers of the cluster of indexers.

8. The method of claim 1, further comprising:
associating a generation identifier with the configuration data generated for each indexer of the cluster of indexers;
in response to an indexer registering one or more new subsets of data, generating new configuration data for each indexer of the cluster of indexers;
associating a new generation identifier with the new configuration data;
sending the new configuration data to each indexer of the cluster of indexers.

9. The method of claim 1, further comprising:
associating a generation identifier with the configuration data generated for each indexer of the cluster of indexers;
receiving an indication that a new site is configured for the cluster of indexers;
in response to receiving the indication that the new site is configured for the cluster of indexers, generating new configuration data for each indexer of the cluster of indexers;
associating a new generation identifier with the new configuration data;
sending the new configuration data to each indexer of the cluster of indexers.

10. The method of claim 1, further comprising:
receiving, by the master node, a request from a search head for data indicating active indexers of the cluster of indexers and a current generation identifier;
sending, to the search head, the data indicating active indexers of the cluster of indexers and the current generation identifier.

11. The method of claim 1, further comprising:
receiving, from a particular indexer of the cluster of indexers, a registration for one or more new subsets of data;
generating, by the master node, replication instructions indicating a set of peer indexers to which the particular indexer is to send the one or more new subsets of data;
sending the replication instructions to the particular indexer.

12. The method of claim 1, further comprising:
receiving, from a particular indexer of the cluster of indexers, a registration for one or more new subsets of data;
selecting, by the master node, a set of peer indexers of the cluster of indexers based on a user-specified indexer replication factor indicating a number of separate indexers at which each subset of data of the one or more new subsets of data is to be stored;
sending the replication instructions to the particular indexer.

13. The method of claim 1, further comprising:
receiving, from a particular indexer of the cluster of indexers, a registration for a one or more new subsets of data;
selecting, by the master node, a set of peer indexers based on both of (i) a user-specified indexer replication factor indicating a number of separate indexers at which the one or more new subsets of data are to be stored, and (ii) a separate user-specified site replication factor indicating a number of sites at which the one or more new subsets of data are to be stored, each site corresponding to a separate user-specified geographic area;
sending the replication instructions to the particular indexer.

14. The method of claim 1, wherein the primary indexer responds with one or more results based on data from one or more subsets of data accessible to the primary indexer, and wherein the subset of data corresponds to a particular time span.

15. The method of claim 1, wherein each site of the one or more sites corresponds to a separate user-specified grouping of indexers.

16. The method of claim 1, wherein each site of the one or more sites corresponds to a separate user-specified geographic location.

17. The method of claim 1, further comprising associating a generation identifier with the configuration data generated for each indexer of the cluster of indexers;
wherein the configuration data includes the generation identifier.

18. The method of claim 1, further comprising associating a generation identifier with the configuration data generated for each indexer of the cluster of indexers;
wherein the generation identifier is separate from the configuration data.

19. One or more non-transitory computer-readable storage media, storing software instructions, which when executed by one or more processors cause performance of:
generating, at a master node, configuration data for each indexer of a cluster of indexers under coordination by the master node, wherein the cluster of indexers is distributed across one or more sites, wherein configuration data for a particular indexer of the cluster of indexers indicates whether the particular indexer is a primary indexer with primary responsibility for responding to search queries originating from one or more search heads, wherein each of the one or more sites comprises a plurality of indexers of the cluster, wherein each indexer is operable to store multiple subsets of searchable data, and wherein each subset of searchable data is operable to be replicated across multiple indexers at the one or more sites, and wherein, in response to a search query, each indexer is configured to use configuration data received from the master node to search associated subsets of searchable data for which it has primary responsibility;
sending, to each indexer of the cluster of indexers, configuration data generated for a respective indexer, wherein the configuration data further indicates whether a particular indexer is a secondary indexer with secondary responsibility for responding to the search queries related to searchable data replicated between the primary indexer and the secondary indexer.

20. The one or more non-transitory computer-readable storage media of claim 19, wherein the primary indexer responds with one or more results based on data from one or more subsets of searchable data accessible to the primary indexer.

21. The one or more non-transitory computer-readable storage media of claim 19, wherein the configuration data further indicates, for each particular subset of searchable data accessible to the primary indexer and for each particular site of the one or more of sites, whether the primary indexer has primary responsibility for responding to search queries originating from the particular site with one or more results based on data from the particular subset of searchable data.

22. The one or more non-transitory computer-readable storage media of claim 19, wherein the instructions, when executed by the one or more computing devices, further cause associating a generation identifier with the configuration data generated for each indexer of the cluster of indexers.

23. The one or more non-transitory computer-readable storage media of claim 19, wherein the instructions, when executed by the one or more computing devices, further cause performance of:
associating a generation identifier with the configuration data generated for each indexer of the cluster of indexers;
in response to determining that a condition associated with the cluster of indexers has changed, generating new configuration data for one or more indexers of the cluster of indexers;
associating a new generation identifier with the new configuration data;
sending the new configuration data to the one or more indexers of the cluster of indexers.

24. The one or more non-transitory computer-readable storage media of claim 19, wherein the primary indexer responds with one or more results based on data from one or more subsets of data accessible to the primary indexer, and wherein the subset of data corresponds to a particular time span.

25. The one or more non-transitory computer-readable storage media of claim 19, wherein the instructions, when executed by the one or more computing devices, further cause performance of:
receiving, from a particular indexer of the cluster of indexers, a registration for one or more new subsets of data;
selecting, by the master node, a set of peer indexers based on both of (i) a user-specified indexer replication factor indicating a number of separate indexers at which the one or more new subsets of data are to be stored, and (ii) a separate user-specified site replication factor indicating a number of sites at which the one or more new subsets of data are to be stored, each site corresponding to a separate user-specified geographic area;

sending the replication instructions to the particular indexer.

26. The one or more non-transitory computer-readable storage media of claim 19, wherein each site of the plurality of sites corresponds to a separate user-specified geographic location.

27. An apparatus, comprising:
a subsystem, implemented at least partially in hardware, that generates, at a master node, configuration data for each indexer of a cluster of indexers under coordination by the master node, wherein the cluster of indexers is distributed across one or more sites, wherein configuration data for a particular indexer of the cluster of indexers indicates whether the particular indexer is a primary indexer with primary responsibility for responding to search queries originating from one or more search heads, wherein each of the one or more sites comprises a plurality of indexers of the cluster, wherein each indexer is operable to store multiple subsets of searchable data, and wherein each subset of searchable data is operable to be replicated across multiple indexers at the one or more sites, and wherein, in response to a search query, each indexer is configured to use configuration data received from the master node to search associated subsets of searchable data for which it has primary responsibility;

a subsystem, implemented at least partially in hardware, that sends, to each indexer of the cluster of indexers, configuration data generated for a respective indexer, wherein the configuration data further indicates whether a particular indexer is a secondary indexer with secondary responsibility for responding to the search queries related to searchable data replicated between the primary indexer and the secondary indexer.

28. The apparatus of claim 27, wherein the primary indexer responds with one or more results based on data from one or more subsets of searchable data accessible to the primary indexer.

29. The apparatus of claim 27, wherein the configuration data further indicates, for each particular subset of searchable data accessible to the primary indexer and for each particular site of the one or more sites, whether the primary indexer has primary responsibility for responding to search queries originating from the particular site with one or more results based on data from the particular subset of searchable data.

30. The apparatus of claim 27, wherein each site of the one or more sites corresponds to a separate user-specified geographic location.

\* \* \* \* \*